US 6,611,348 B1

(12) United States Patent
Chase et al.

(10) Patent No.: US 6,611,348 B1
(45) Date of Patent: Aug. 26, 2003

(54) SYSTEM AND METHOD FOR COMMUNICATION OVER A TCP/IP NETWORK WITH AN APPLETALK NETWORK FOR PUBLISHING AND PRINTING SERVICES

(75) Inventors: John H. Chase, Stillwater, MN (US); Scott R. Rosenlund, Chaska, MN (US)

(73) Assignee: Banta Corporation, Menasha, WI (US)

( * ) Notice: Subject to any disclaimer, the term of this patent is extended or adjusted under 35 U.S.C. 154(b) by 0 days.

(21) Appl. No.: 09/364,606

(22) Filed: Jul. 30, 1999

(51) Int. Cl.$^7$ .............................................. G06K 15/00
(52) U.S. Cl. ..................................... 358/1.15; 358/3.29
(58) Field of Search ............................. 358/1.1, 1.12, 358/1.18, 1.15, 3.29; 329/100.01, 100.06

(56) References Cited

U.S. PATENT DOCUMENTS

| | | | | |
|---|---|---|---|---|
| 4,839,829 A | * | 6/1989 | Freedman | 364/519 |
| 5,469,353 A | * | 11/1995 | Pinsky | 364/413.01 |
| 5,754,747 A | * | 5/1998 | Reilly | 395/114 |
| 5,813,348 A | * | 9/1998 | Zingher | 101/494 |
| 5,867,636 A | * | 2/1999 | Walker | 395/114 |
| 6,088,786 A | * | 7/2000 | Feierbach | 712/200 |
| 6,266,150 B1 | * | 7/2001 | Brossman | 358/1.15 |
| 6,473,788 B1 | * | 10/2002 | Kim | 709/209 |
| 2002/0063877 A1 | * | 5/2002 | Lucivero | 358/1.13 |
| 2002/0099854 A1 | * | 7/2002 | Jorgensen | 709/249 |

* cited by examiner

Primary Examiner—Jerome Grant, II
(74) Attorney, Agent, or Firm—Foley & Lardner

(57) ABSTRACT

A printing and publishing system providing prepress, content management, infrastructure, and workflow services to system subscribers using computers equipped with the AppleTalk communication protocol in real time using a communication network is disclosed herein. The printing and publishing system includes a central service facility and an end-user facility and/or a printing company facility. The end user facility provides page building operations using computers equipped with the AppleTalk communication protocol. The page building operations include the design and construction of pages from images, text, and data available via said communication network. The central service facility provides storage, file processing, remote access, and content management operations. The file processing operations include generating a plate-ready file from pages designed at said end user facility, said plate-ready file having a file format capable of high resolution and ready for creation of a printing plate. The printing company facility provides printing operations such as producing a printing plate from said plate-ready file.

11 Claims, 19 Drawing Sheets

| | | 1302 | 1304 | 1306 | 1308 | 1310 |
|---|---|---|---|---|---|---|
| | | FILE NAME | SKU | RLTD SKU | PRODUCT | IMGS TO WEB |
| | ☐ | GS10222 | 10-22 | 10-223 | Beanbags | 2 |
| | ☐ | GS10224 | 1024 | GB10-230 | Beanbags | 3 |
| | ☐ | GS102281 | 1028 | GB10-228 | Bdr. Patrol | 0 |
| | ☐ | GS102282 | 1029 | GB10-229 | Beanbags | 3 |
| | ☐ | GS102311 | 10231 | GB10-231 | Beanbags | 3 |
| | ☐ | GS102312 | 10232 | GB10-232 | Bdr. Patrol | 1 |
| | ☐ | GS10232 | 10234 | GB10-233 | Dance Kit | 0 |
| | ☐ | GS10234 | 41-64 | GB10-234 | Dance Kit | 3 |

TILE VIEW | SINGLE CLMN | TEXT VIEW | PREVIEW

UPDATE SELECTION

BROWSE
SELECTION VIEW
SELECT ALL
CLEAR
LOAD
SAVE
DELETE
EDIT
DOWNLOAD
EMAIL

SEARCH
SHOW ALL

UPLOAD
ADMIN
HELP
LOG OUT

FIG. 13

SYSTEM AND METHOD FOR COMMUNICATION OVER A TCP/IP NETWORK WITH AN APPLETALK NETWORK FOR PUBLISHING AND PRINTING SERVICES

FIELD OF THE INVENTION

The present system relates generally to the field of publishing and printing. More particularly, the present invention relates to a system and method of providing publishing and printing services via a communications network.

BACKGROUND OF THE INVENTION

Key steps for producing printed materials using a plate process include (1) preparing copy elements for reproduction, (2) prepress production, (3) platemaking, (4) printing, and (5) binding, finishing and distribution.

In this printing production process, an "end user", such as, publishers, direct marketers, advertising agencies, and corporate communication departments, prepares copy elements for reproduction. In this "design" stage of the printing process, the end user provides images and data using slides or computer files to create one or more "pages". Pages can be designed using computer programs such as QuarkXpress or other publishing software packages. Slides or computer disks containing pages to be printed are sent (via mail or express carrier) to be prepared for creation of a plate.

In the prepress production stage, the end user input (or "copy") is transformed into a medium that is reproducible for printing. Typically, prepress involves typesetting, illustration, page building and design, image capture, image color correction, file conversion, RIPing, trapping, proofing, imposition, filmsetting, and platesetting. "Proofing" involves producing a proof, or sample, of what the printed product will look like. The proof is sent by mail or express carrier to the end user for review and approval. After alterations are made, new proofs are sent to the end user. Once approval of the proof is given by the end user, a medium such as a computer to plate (CTP) file is produced and sent to the printer. "Imposition" involves the set of pages on a particular plate as well as their positioning and orientation. Imposition is particularly important in the creation of booklets or catalogs, where pages are positioned using register marks to assist in the stripping, collating, and folding of the printed product.

In the platemaking stage, a "printer" manufactures a printing plate using the medium created during prepress. Where a CTP file is used, the printer converts the CTP file into a printing plate or goes directly to a digital press. In the printing stage, the printer uses the printing plate to create the printed product. In the binding, finishing and distribution stage, the printed product is prepared in its final form.

Each step in the printing production process described briefly above can be accomplished using a variety of different known systems and techniques. Nevertheless, such conventional systems have many delays, particularly in the transporting of pages and proofs to and from the end user and prepress provider. Due to delays and the fragmented nature of conventional printing production systems, errors often occur. Further, typical printing production systems are limited in their ability to re-purpose data, manage content of pages, and piece together individual processes or tasks to establish an efficient production system or "workflow". Indeed, no conventional system combines prepress, content management, infrastructure (server, storage & distribution) and workflow services.

Conventional printing and publishing systems generally include Macintosh computers or workstations which communicate with each other using the AppleTalk protocol. AppleTalk protocol cannot however be communicated over switched networks such as the Internet and private networks where nodes in the network have IP (Internet Protocol) addresses. As such, conventional systems cannot merely be coupled to a communication network for remotely controlling design, prepress and print processes.

There is a need for a system which combines design, prepress, content management, infrastructure (server, storage & distribution) and workflow. For end users in particular, there is a need for a system and a method to gain control of the design, prepress, and print processes. To save time and costs, there is a need to eliminate manual shipping of proofs back and forth to a prepress provider. Further, there is a need for a prepress capability at a local facility without the time and costs of shipping proofs back and forth to a prepress provider. Even further, there is a need for a system and method to provide plate-ready files over a communications network for delivery to a CTP device. Moreover, for commercial printers, there is a need for a system and method to remotely drive a plate-setting device located at a printer's facility. Further, there is a need to decrease the amount of time necessary to generate printing plates after processing of the pages (i.e., the cycle time). Even further, there is a need for providing access to the functionality of high-end server, storage, and networking equipment to the printer facility without the associated capital investments.

SUMMARY OF THE INVENTION

The present invention provides a solution for communicating and managing printing and publishing services. The technique is preferably implemented in a system architecture which allows remote printing and publishing services in real time. System components are installed at an end user facility, a printing company facility, and a central service facility. These components may include hardware, firmware, and software components which facilitate the exchange, management, and adaptation of data for the printing and publishing services provided.

In a preferred configuration, software included in the system architecture facilitates creation of pages at the end user facility and final printing of the created pages at a printing company facility. Digital files, including graphics, images, text, and art used in the creation of these pages, are stored at the central service facility and are accessible at the end user facility. Management software facilitates the management and organization of data files throughout the system. The technique may also facilitate the integration of other services into the system.

One embodiment of the invention relates to a printing and publishing system providing prepress, content management, infrastructure, and workflow services to system subscribers using computers equipped with the AppleTalk communication protocol in real time using a communication network. The printing and publishing system includes a central service facility and an end-user facility and/or a printing company facility. The end user facility provides page building operations using computers equipped with the AppleTalk communication protocol. The page building operations include the design and construction of pages from images, text, and data available via said communication network. The central service facility provides storage, file processing, remote access, and content management operations. The file processing operations include generating a plate-ready file from pages designed at said end user facility, said plate-ready file having a file format capable of high resolution and ready for creation of a printing plate. The printing company facility provides printing operations such as producing a printing plate from said plate-ready file.

Another embodiment of the invention relates to a method for providing printing and publishing services to a remote client in real time using a Transmission Control Protocol/Internet Protocol (TCP/IP) network and an AppleTalk Protocol network. The method includes generating a page layout on a computer equipped with the AppleTalk communication protocol at a remote client, choosing a TCP/IP communication mode on said computer, and communicating said page layout to a remote service facility via a communication network utilizing TCP/IP.

Another embodiment of the invention relates to a method of connecting computers equipped with the AppleTalk communication protocol to a printing and publishing system for providing Transmission Control Protocol/Internet Protocol (TCP/IP) communication over a network. The method includes adding a TCP/IP stack to a stack on computers equipped with the AppleTalk communication protocol, assigning an Internet Protocol (IP) addressing scheme to said computers, and providing a selection indicia for TCP/IP communications on said computers.

BRIEF DESCRIPTION OF THE DRAWINGS

FIG. 13 is an interface page for displaying search results to the end user after an exemplary search of the DCM system of FIG. 11 is conducted;

DETAILED DESCRIPTION OF THE DRAWINGS

Figure 1:
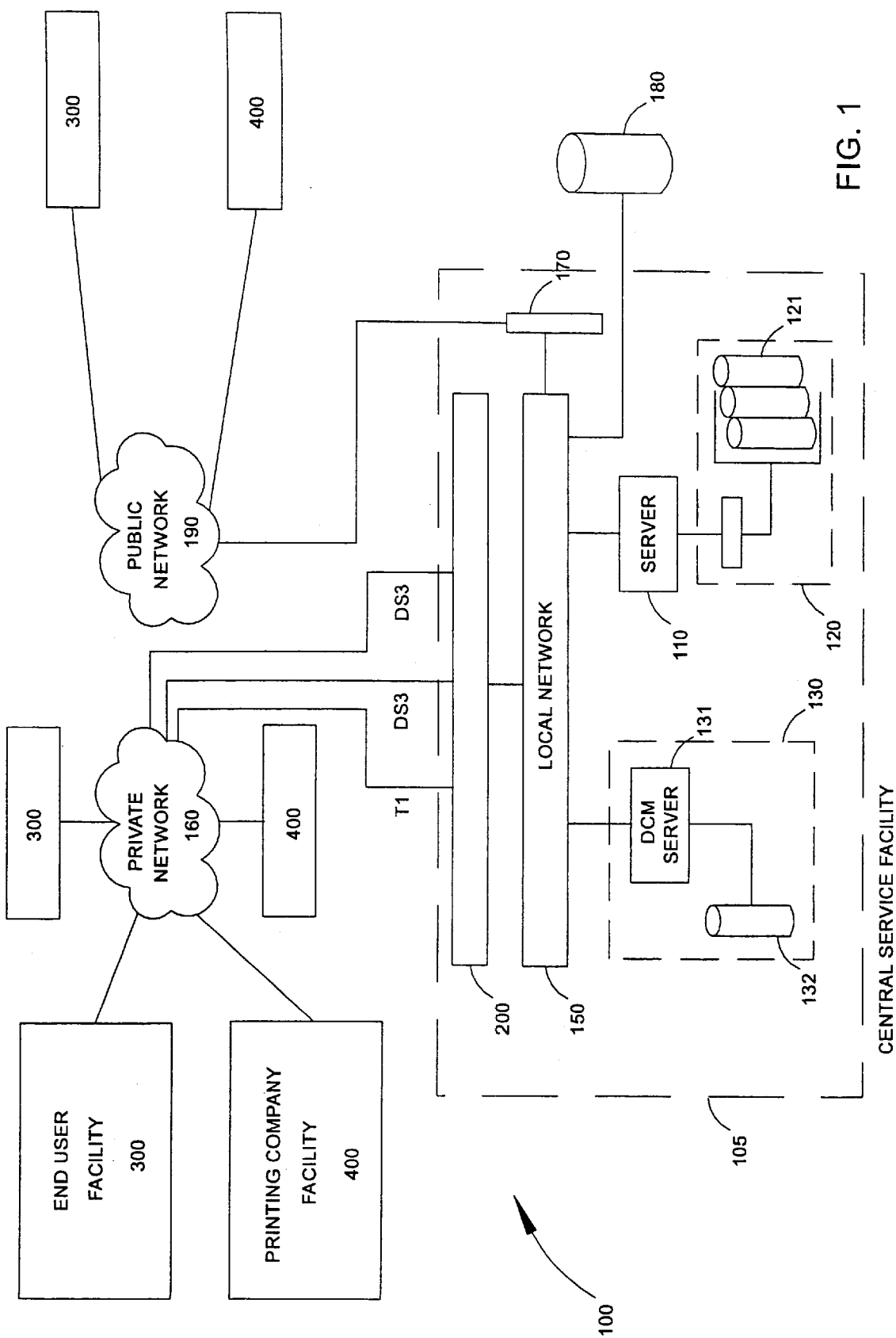
FIG. 1 is a diagrammatical representation of a series of printing and publishing systems coupled together via a communication network for providing prepress, content management, infrastructure, and workflow within one interconnected printing and publishing system.

Turning now to the appended drawings, and referring first to FIG. 1, a printing and publishing system 100 is illustrated which integrates prepress, content management, infrastructure, and workflow processes into one real time system. Printing and publishing system 100 includes a central service facility 105, an end user facility 300, and a printing company facility 400, all of which are interconnected via a private network 160 or a public network 190.

System 100 preferably includes a communication routing device 200, such as, routers and switches. Communication routing devices are included at central service facility 105, end user facility 300, and printing company facility 400. Routers include multiple interfaces to handle the variety of network connections in system 100. Routers and switches provide for internet and extranet connections. In general, switches switch traffic using ATM cells and Ethernet frames. Routers route TCP/IP data packets between the different IP networks. Routers are commercially available components, such as, the 3Com Netbuilder II and CISCO 7500.

Communication routing device 200 includes an internal firewall which authenticates data traffic incoming from private network 160 or public network 190. In the exemplary embodiment, communication routing device 200 directs data traffic utilizing the Transmission Control Protocol/Internet Protocol (TCP/IP) communication scheme. In alternative embodiments, communication routing device 200 communicates using any of a variety of communication protocols.

While communication routing device 200 includes a firewall capability, printing and publishing system 100 can also include a separate firewall 170. Firewall 170 is a security barrier which stops all data traffic incoming from public network 190 and checks conditions and authentication of the data traffic for security purposes.

Private network 160 is a network of subscribers to printing and publishing system 100 with communication links to central service facility 105. Private network 160 is an asynchronous transfer mode (ATM) network, a synchronous optical network (SONET), or any packet or cell switched network. In the exemplary embodiment, communication links to network 160 include DS3 lines, T-1 lines, Bonded T1 lines, and any other dedicated network connection. Considerations for the type of network connection used are related to data capacity or speed. DS3 lines, for example, provide for an operational speed of 44.736 MBps. Alternatively, OC3, OC12, or any other communication lines can be coupled to local network 150 to provide high speed dedicated network connections. Other communication connections to local network 150 can include ISDN lines. ISDN lines provide between 128 k to 1.544 MBps data capacity or speed.

Public network 190 is a network of subscribers and non-subscribers to printing and publishing system 100. In an exemplary embodiment, public network 190 is the Internet. Public network 160 is connected to central service facility 105 via a firewall 170. Subscribers to printing and publishing system 100 in external network 190 are allowed access to a cached copy of their archived files via firewall 170. In the exemplary embodiment, firewall 170 is the commercially available Checkpoint Firewall-1. Subscribers to network 190 can also have a firewall at end user facility 300 or printing company facility 400 for data traffic incoming from public network 190.

Data may be exchanged between central service facility 105 and either private network 160 or public network 190 in any suitable format, such as in accordance with the Internet Protocol (IP), the Transmission Control Protocol (TCP), or other known protocols. Moreover, certain of the data may be transmitted or formatted via markup languages such as the HyperText Markup Language (HTML), or other standard languages.

Printing and publishing system 100 can also include an offsite storage facility 180 coupled to central service facility 105. Offsite storage facility 180 provides a remote archival system for disaster contingency purposes. Offsite storage facility 180 preferably includes digital linear tape (DLT) which secures storage of files also stored at central service facility 105. Offsite storage facility 180 is preferably connected via a minimum of a DS3 communication connection. In the exemplary embodiment, backups of files are created at offsite storage facility 180 within minutes of creation at central service facility 105.

In the exemplary embodiment, central service facility 105 includes a server 110, a hierarchical storage management (HSM) system 120, a digital content management (DCM) system 130, a network access device (AND) 140, a local network 150, and firewall 170. Alternatively, system components located at central service facility 105 can be installed at end user facility 300 or printing company facility 400. For example, while the exemplary embodiment illustrates DCM system 130 at central service facility 105, with access at end user facility 300.

Server 110 is a computer server, such as, the commercially-available Sun Microsystems E6500 Enterprise server. Server 110 includes multiple input/output (I/O) boards and runs a software application, such as FullPress, commercially-available from Xinet. Server 110 also includes redundant and hot-swappable hardware, allowing failed equipment to be replaced without interruption. That is, replacement can be accomplished without turning power off. While the exemplary embodiment includes a particular computer server and software, server 110 is alternatively any scalable, enterprise computer server and can run any of a variety of application programs. For example, while server 110 preferably operates using FullPress software, any open prepress interface (OPI) software can be used. OPI software provides Macintosh desktop computers or other types of computers which are connected to remote network 160 with access to server 110. OPI software also swaps low resolution files to larger high resolution files. Other types of OPI software include IPT and Helios, both of which are available commercially.

In general, HSM system 120 provides multi-tiered storage and automatic archiving and backup of electronic files communicated across private network 160 or public network 190. In one embodiment, HSM system 120 includes redundant arrays of inexpensive disks (RAID) fiber channel storage, which is highly scaleable and storage area network (SAN) capable. In this embodiment, HSM system 120 includes a capacity of greater than a Terabyte of RAID storage. Advantageously, the speed and high capacity of the RAID storage in HSM system 120 provides for storage and retrieval of high resolution images and other large files.

In the exemplary embodiment, HSM system 120 also includes a magneto-optical jukebox and digital linear tape (DLT), which provide additional storage capacity. Both are commercially available. The magneto-optical jukebox and the DLT provide redundancy of files stored in RAID storage. That is, electronic files stored in RAID storage are copied into the magneto-optical jukebox and DLT. Such redundancy provides for a low risk of lost files. The DLT has slower access speed in comparison to other storage structures in the exemplary embodiment of HSM system 120. HSM system 120 is illustrated and described in greater detail with reference to FIGS. 3 and 10.

Digital content management (DCM) system 130 includes a computer server 131 running software which manages the digital files communicated to and from local network 150. In the exemplary embodiment, DCM system 130 includes two Sun MicroSystem Solaris servers: an Ultra2 and a Sparc 1000. DCM system 130 provides multi processing, multi-user access, high input/output capabilities, security, and stability. In an alternative embodiment, DCM system 130 employs server 110 as one main server. In the exemplary embodiment, DCM server 131 is separate from the main server and enables additional testing, maintenance, and upgrades without affecting mission critical production requirements. DCM server 131 operates using a variety of image and database management software tools, including Oracle, Telescope, FullPress, Web Native, and Java.

DCM server 131 preferably utilizes the operating system known as Solaris, a widely-used version of the UNIX operating system. In alternative embodiments, DCM server 131 operates using a Microsoft NT server. DCM system 130 is coupled to a database 132 and utilizes graphic engine software, such as, Telescope. DCM system 130 is utilized to perform content management operations as described herein and in particular with reference to FIG. 11. Content management operations also require use of HSM system 120, described herein with reference to FIG. 10 in particular. Content management operations, such as, search, select, place, and save provide for the page design and platemaking of printing and publishing system 100.

Network access device (AND) 140 is a device which couples local network 150 to an external private network, such as, private network 160. In one embodiment, AND 140 connects local network 150 with a private network called WAM!NET™. WAM!NET is a private communication network which offers connectivity of databases for content management as well as proofing devices for proofing a file. WAM!NET connects printing companies to advertising agencies, publishers, and graphic design firms. Nevertheless, document delivery by WAM!NET is not done in real time.

AND 140 includes a communication router, a channel service unit/data service unit (CSU/DSU), a UNIX server, an interruptible power supply, a disk storage subsystem, and a high-speed asynchronous modem. WAM!NET communicates using TCP/IP and AppleTalk protocols.

Local network 150 is preferably a local area network (LAN) including a combination of fast Ethernet and ATM OC3 ports which utilize campus ATM switches. Alternatively, local network is any kind of communication network capable of connectivity to the foregoing system components including Gigabit Ethernet.

The foregoing system components at the central service facility 105 are by way of illustration only. Other components can be included or substituted at central service facility 105. Such additional components can enhance the functionality and operability of printing and publishing system 100.

Figure 2:
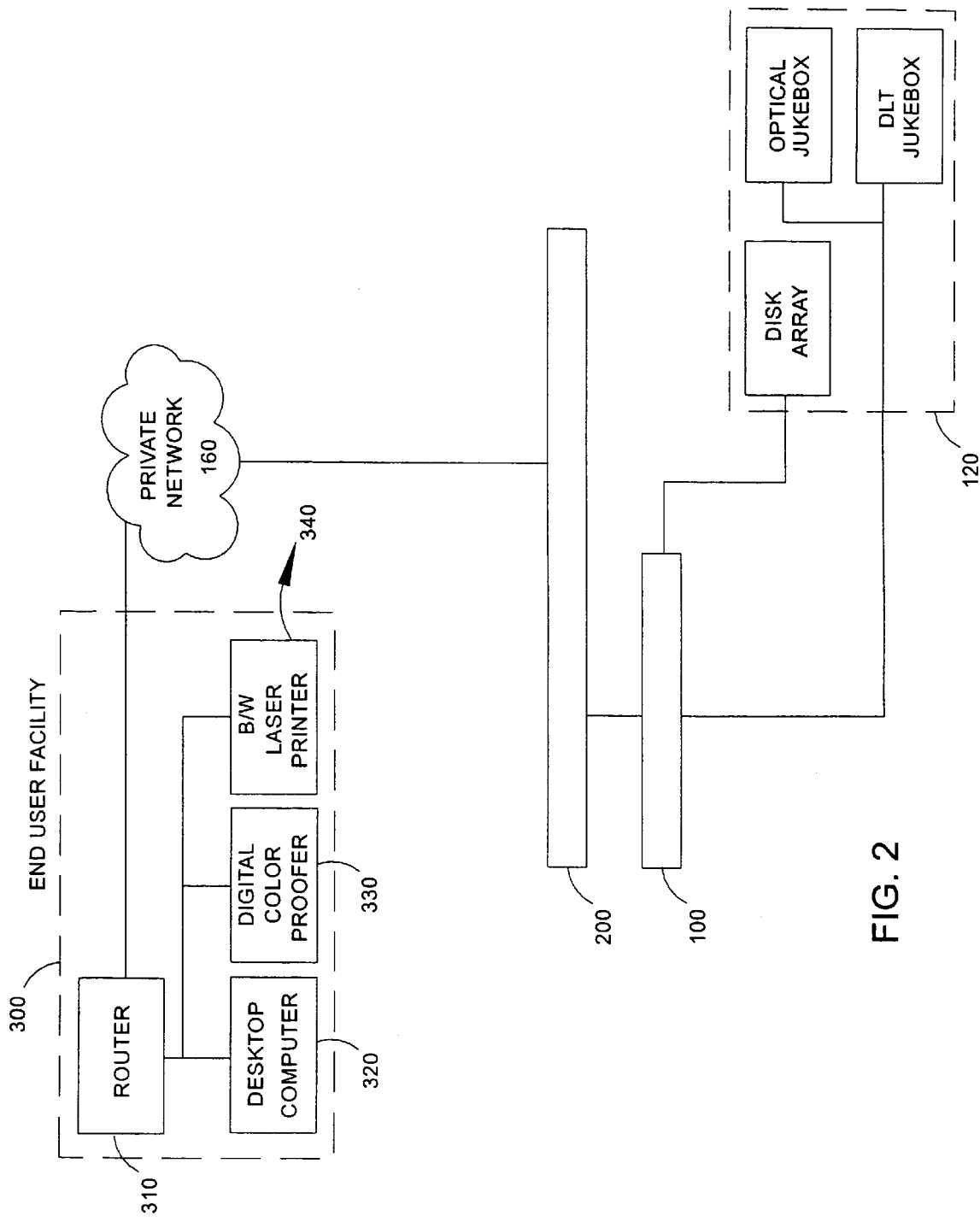
FIG. 2 is a block diagram of the printing and publishing system shown in FIG. 1, illustrating certain functional components of an exemplary embodiment of the end user facility and the central service facility.

FIG. 2 is a block diagram illustrating a functional view of the system components at central service facility 105 and end user facility 300 in an exemplary embodiment. As shown in FIG. 2, end user facility 300 includes a router 310, a desktop computer 320, a digital color proofer 330, and a black and white laser printer 340. End user facility 300 stores files in HSM system 120 at central service facility 105. Thus, end user facility 300 has the advantage of reducing local storage needs while increasing overall capabilities to organize and maintain high volumes of data. Further, connectivity to central service facility 105 reduces the investment needed in storage capacity at end user facility 300 while allowing the end user on-line access to data via telecommunication connections.

Router 310 connects end user facility 300 to private network 160 and central service facility 105 using a variety of different protocol communication schemes. As indicated previously, routers are communication routing devices and can be replaced with switches, depending on the network connected to end user facility 310. Desktop computer 320 can be any of a variety of computer machines, such as, Macintosh computers or personal computers (PCs). Desktop computer 320 runs a variety of computer programs, such as, QuarkXpress or other page designing programs. Desktop computer 320 provides for page building operations such as editing or placement of images and data provided via network 160. FPO ("for position only") images or low resolution images, are downloaded via private network 160 from HSM system 120 at central service facility 105. Links are established from the low resolution images to the corresponding high resolution files stored on HSM system 120. Such links provide for open prepress interface (OPI) processes. As described herein, OPI processes allow low resolution files to be quickly communicated and manipulated in the page building process. Low resolution images are replaced by high resolution files before contract proofs are created.

Digital color proofer 330 and black and white laser printer 340 are printing devices which provide printed copies, samples, or proofs from files output from desktop computer 320. Advantageously, digital color proofer 330 is a 4-color machine, making quality color break visible upon inspection. Printer 340 includes an onboard raster images processor (RIP) to rasterize files. Proofer 330 has a separate RIP. "Rasterize" is the conversion of data to a bitmap. A bitmap is a digitized collection of binary pixel information that gives an output device, such as, printer 340 or proofer 330, the ability to image data to paper, film, or plate. End user facility 300 can use any of a variety of proofers or printers, including a variety of software to interface with the proofer or printer.

The foregoing system components at end user facility 300 are by way of illustration only. Other components can be included or substituted at end user facility 300. Such additional components may enhance the functionality and operability of printing and publishing system 100.

Figure 3:
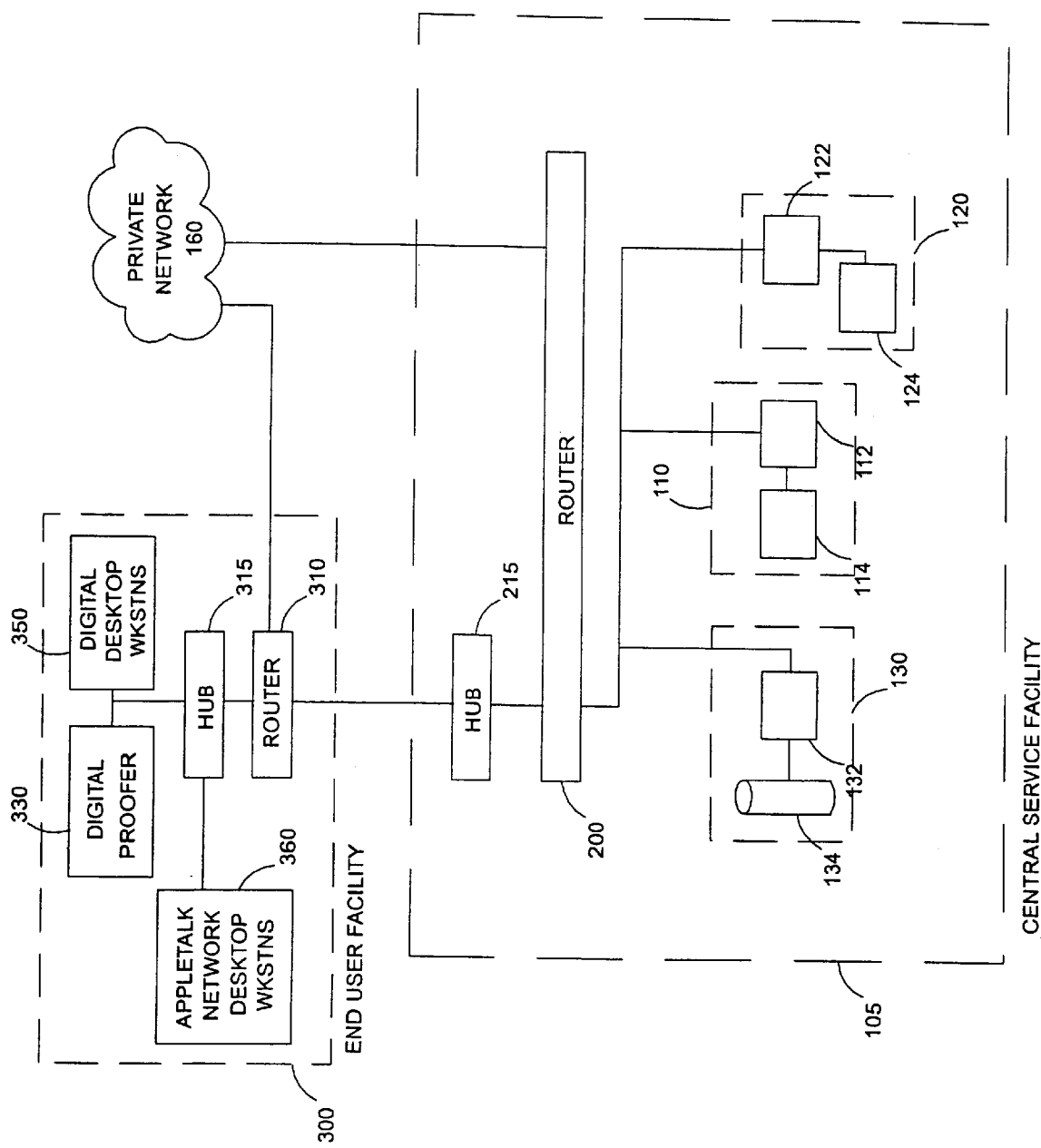
FIG. 3 is a block diagram of the printing and publishing system shown in FIG. 1, illustrating certain functional components of a second exemplary embodiment of the end user facility and the central service facility.

FIG. 3 is a block diagram illustrating a functional view of the system components at central service facility 105 and end user facility 300 in a second exemplary embodiment. In this alternative configuration, end user facility 300 includes a hub device 315, digital desktop workstation 350, and AppleTalk network desktop workstation 360. End user facility 300 receives communications from central service facility 105 via a point to point communication connection (T1 to DS3) which is coupled to router 310 at end user facility 300.

At central service facility 105, router 200 communicates with a hub 215 which couples server 110, HSM system 120, and DCM system 130. In the embodiment illustrated in FIG. 3, server 110 includes a server device 112 and a storage device 114. Further, HSM system 120 includes a server device 122 and a storage device 124. HSM system 120 is described in greater detail with reference to FIG. 10. DCM system 130 includes a database server device 132 and a database 134. These system components are by way of example only and provide for the operational components of the system as described herein. Other components can be included at either central service facility 105 or end user facility 300.

Figure 4:
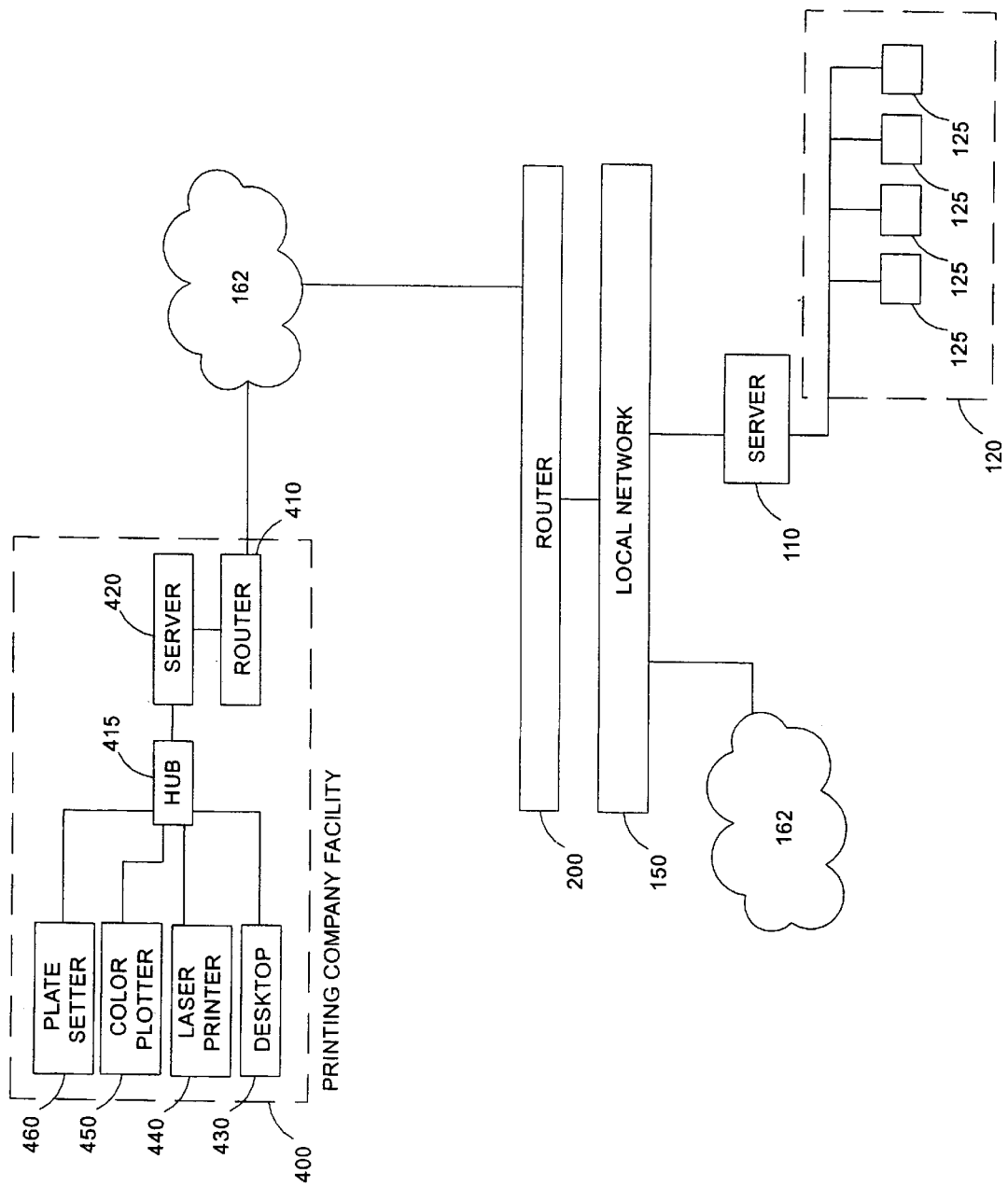
FIG. 4 is a block diagram of the printing and publishing system shown in FIG. 1, illustrating certain functional components of an exemplary embodiment of the printing company facility and the central service facility.

FIG. 4 is a block diagram illustrating a functional view of the system components at central service facility 105 and printing company facility 400 in an exemplary embodiment. Printing company facility 400 includes a router 410, a hub 415, a server 420, a desktop computer 430, a laser printer 440, a color plotter 450 and a platesetter 460. Hub 415 coordinates communication to and from server 420, desktop 430, laser printer 440, color plotter 450, plate-setter 460, and router 410. Server 420 operates using software which includes programs to rasterize files in preparation for creation of plates.

Desktop computer 430 is any of a variety of different computer stations, including commercially available Macintosh computers (MACs) or personal computers (PC) as well as dedicated workstations. Laser printer 440 is also commercially available, such as the digital Dylux laser printer. Color plotter 450 provides color samples, proofs, or printed output versus the black and white output from laser printer 440.

Platesetter 460 provides digital plate production. In the exemplary embodiment, platesetter 460 can image thermal plates up to a resolution of 3,200 dpi with a capacity of 200 plates a day. Platesetter 460 requires a customized front-end RIP to drive imaging. RIP software is included in server 420.

Printing company facility 400 receives the digital information via a communications connection coupled to a router 200 and network 150. Network 150 is coupled to server 110 and HSM system 120. Network 150 may include a hub, such as, hub 215 (FIG. 3). In the embodiment illustrated in FIG. 4, HSM system 120 includes a variety of different storage devices 125. Network 150 is also coupled to a commercial network 162, such as, WAM!NET, or a public network, such as, the Internet.

In the presently preferred embodiment, the foregoing functional components illustrated in FIGS. 1–4 may be configured as hardware, firmware, or software on any appropriate computer platform. The functional components of each facility may include additional personal computers or workstations, in addition to a main frame computer in which one or more of the servers, the routers, and so forth, are configured. It also should be noted that the foregoing functional components may be adapted in a variety of manners for executing the functions described herein. In general, the functional components facilitate the printing and publishing services provided at a end user facility and a printing company facility, which is preferably implemented in a real time manner to provide increased response time to all of the printing and publishing services.

Figure 5:
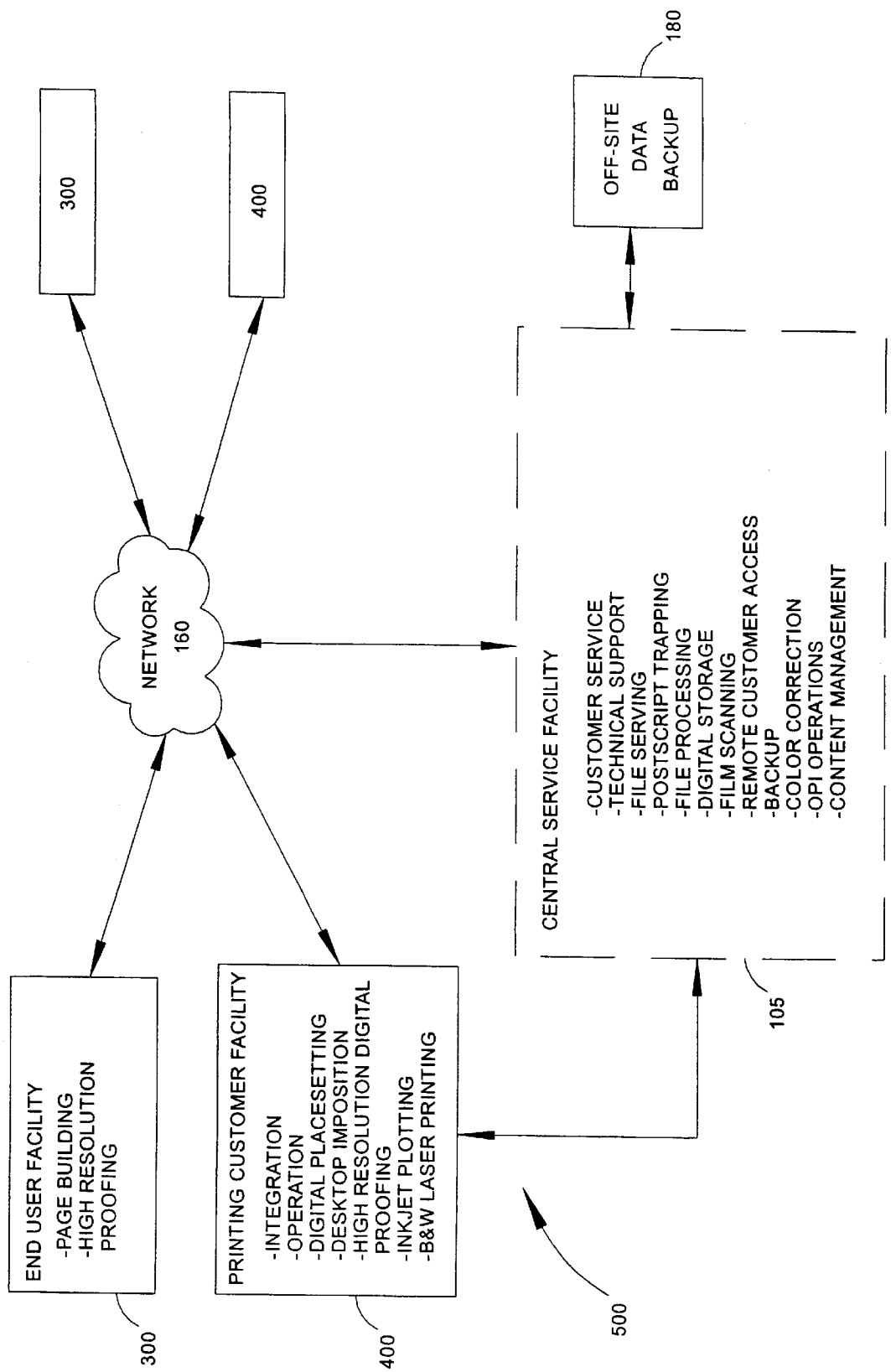
FIG. 5 is a block diagram of the printing and publishing system shown in FIG. 1, illustrating certain operational components of an exemplary embodiment of the end user facility, the printing company facility, and the central service facility.

FIG. 5 illustrates certain operational components of an exemplary embodiment of end user facility 300, printing company facility 400, and central service facility 105 in printing and publishing system 100. The operational components include processes or tasks which are pieced together to establish an efficient printing and publishing production system. Operational components are shown in FIG. 5 and discussed herein with respect to a particular facility; however, operations are not limited to being performed by a particular facility. For example, prepress operations can be performed by central service facility 105 or printing company facility 400.

Exemplary operational components carried out by end user facility 300 include page building and high resolution proofing. Page building includes the assembly of page elements, such as, text and art to create a page. High resolution proofing includes the review of a sample, printer proof of the page. A proofing device, such as, digital color proofer 330 or laser printer 340 (FIG. 2), are examples of system components used to output the sample. A proof or sample is different than an actual print in that an actual print is normally printed via a large-format press and a proof is output from small proofing devices. In the case of a proof, the image data is transferred directly to paper. In the case of an actual print, there are intermediate stages between the imaging of data and its transfer to paper. Once the sample or proof is printed, it is reviewed to check for content accuracy and color quality.

Exemplary operational components carried out by the printing company facility 400 include production management, equipment operation, digital plate-making, desktop imposition, high resolution digital proofing, inkjet plotting, black and-white laser printing, platemaking, and press.

Equipment operations are performed by trained individuals that operate equipment or perform finctions necessary to complete a project at various stages of the production cycle. Black and White laser proofing is used to verify the content of an individual page or image. High resolution digital proofing provides a color reproduction of data that is contained in a digital file to verify that its content and color is accurate. Desktop imposition enables digital positioning of pages into a layout that facilitates the output of a printed product to a pre-specified layout or sequence, which is dictated by the equipment that will be used to produce the product. Inkjet plotting is used to output a large format proof to verify the placement of digital pages in an imposition that will represent what will be imaged to a printing page. Digital platesetting interprets and images digital data onto a printing plate that is used as the medium to transfer ink to paper on a printing press. Press includes any of a variety of plate printing processes, such as, offset, flexo, and gravure.

Exemplary operational components carried out by the central service facility 105 include customer service, technical support, proofreading, trapping, file processing, film scanning, remote customer access, color correction, backup, data storage, OPI operations, content management, disaster recovery and training.

Trapping involves an overlap or underlap between colors that butt against each other to compensate for misregistration during printing. Typical machines and programs used to perform trapping include Art Work Systems' Art Pro, Scitex Systems' Full Auto Frames, and page building programs such as QuarkXpress or Adobe Illustrator.

File processing includes gathering linked data and supporting art and fonts into a single file that is stable, predictable, and ready to image to proof or plate. The machines and/or programs used to conduct file processing include the application used to build a page, such as, QuarkXpress, InDesign by Adobe Systems and the software programs used to generate stable, predictable, plate-ready files. Such software programs include Adobe Acrobat Distiller, Art Work System and Scitex Brisque.

Color correction includes manipulation of a digital file to more accurately represent the printed form to the original. Machines or programs used for color correction include programs such as Adobe PhotoShop.

Backup includes using HSM system 120 (FIG. 1) to copy files immediately to different media types. Redundancy of copies on multiple storage median in HSM system 120 provides for appropriate backups. Backup techniques and program are selected based on ease of use, scalability, and reliability.

Data storage includes storage of files saved at end user structure 300 in HSM system 120. In particular, when an operator at desktop computer 320 saves as file, the file is automatically saved via network 160 at HSM system 120.

File processing includes performing OPI operations. OPI (open pre-press interface) operations include high resolution image swapping. The programs and machines used for OPI include applications, such as, Xinet Full Press, Helios OPI, Color Central, IPT's Can OPI, and other applications. OPI, or image swapping, can be utilized in two areas during operation of system 100. Specifically, there is OPI of images and OPI of complete pages. As an alternative to page-based OPI, PDF and Extreme applications can be used. As an alternative to image-based OPI, high data compression capabilities allow high resolution image files to be compressed and used as lower resolution image files. Decompression of the image files happens dynamically at the RIP stage.

OPI operations provide for the use of a lower resolution file to be used as a proxy to the higher resolution file. Lower resolution files can be maintained with smaller storage capacity devices, such as, system components at user facility 300. Further, lower resolution files can be transferred via a network much faster.

Content management includes the capture, organization, archival, retrieval, and reuse of digital assets or electronic files, such as text, graphics, photos, artwork, full pages, audio, video, and completed projects. Content management facilitates the internal and external sharing of assets; organizes and catalogs the content; simplifies the creation of packages, advertising, and collateral materials; and allows users to browse, search and retrieve their files and data. Functional components used in content management can include a computer server, a relational database, at least one graphic engine, and a web-compliant Java interface. Content management operations are performed primarily utilizing DCM system 130 (FIG. 1).

Figure 16:
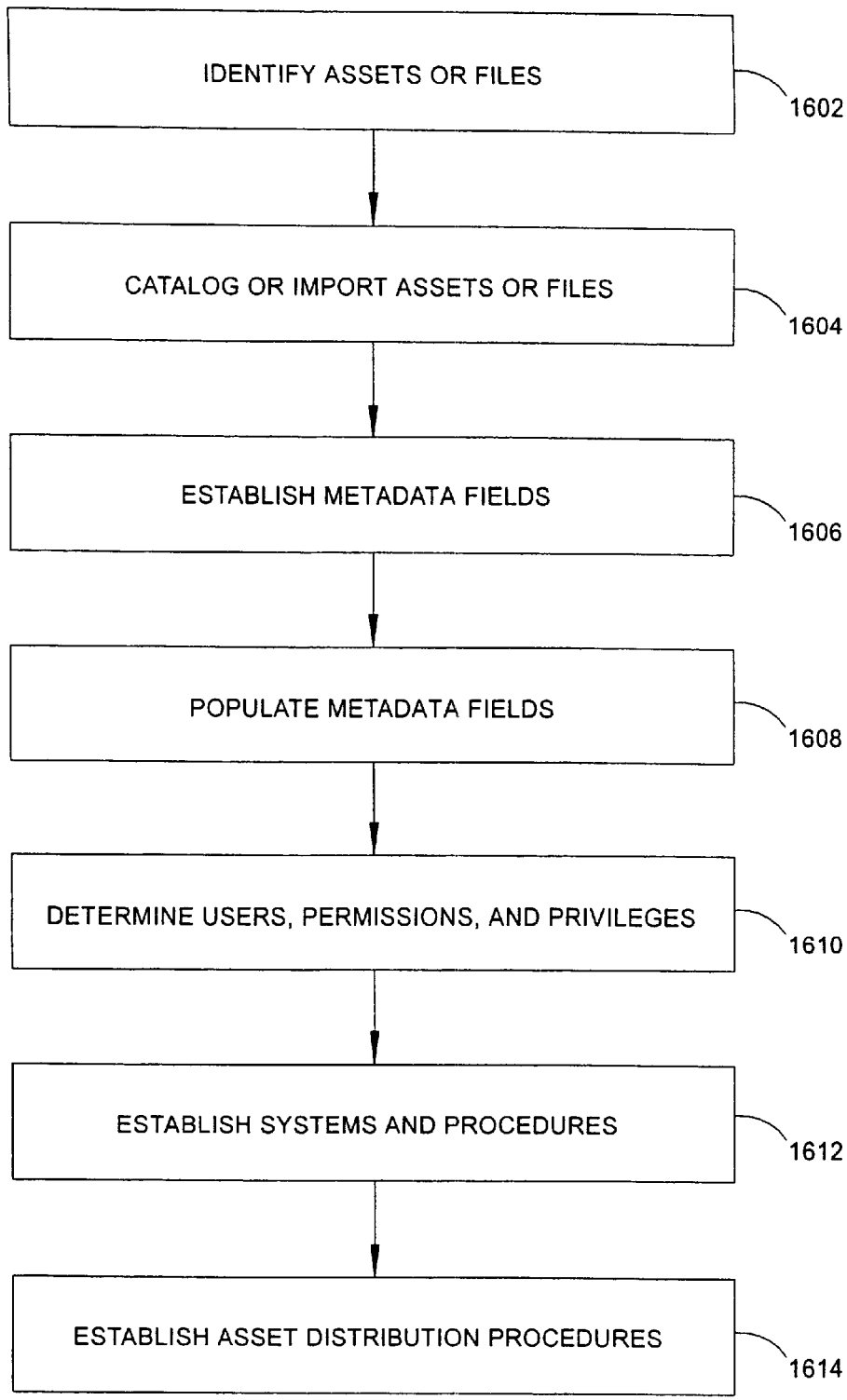
FIG. 16 illustrates the process of creating and populating the DCM content management system.

An exemplary process of content management is described as follows and shown in FIG. 16. First, assets or files to be databased are identified (block 1602). The assets or files are cataloged or imported into the digital content management (DCM) database (block 1604). The necessary metadata or attributes of information that will be tracked for each asset are established (block 1606). The metadata is either entered manually or integrated with existing business databases (block 1608). The users who will have access to the database are established, including permission and privileges (block 1610). The necessary systems and procedures to secure, backup, and archive the database are established (block 1612). The necessary systems and procedures to distribute assets to users are established (block 1614).

The DCM system provides a database or other record of all the files that a user wants to keep track of and a variety of different ways to access that database and those files. Advantageously, any authorized user, anywhere in the world, can access content managed by the DCM system over any available LAN, WAN or Internet connections. DCM system functionality and operations are discussed further in more detail with reference to FIG. 11 et seq.

Figure 6:
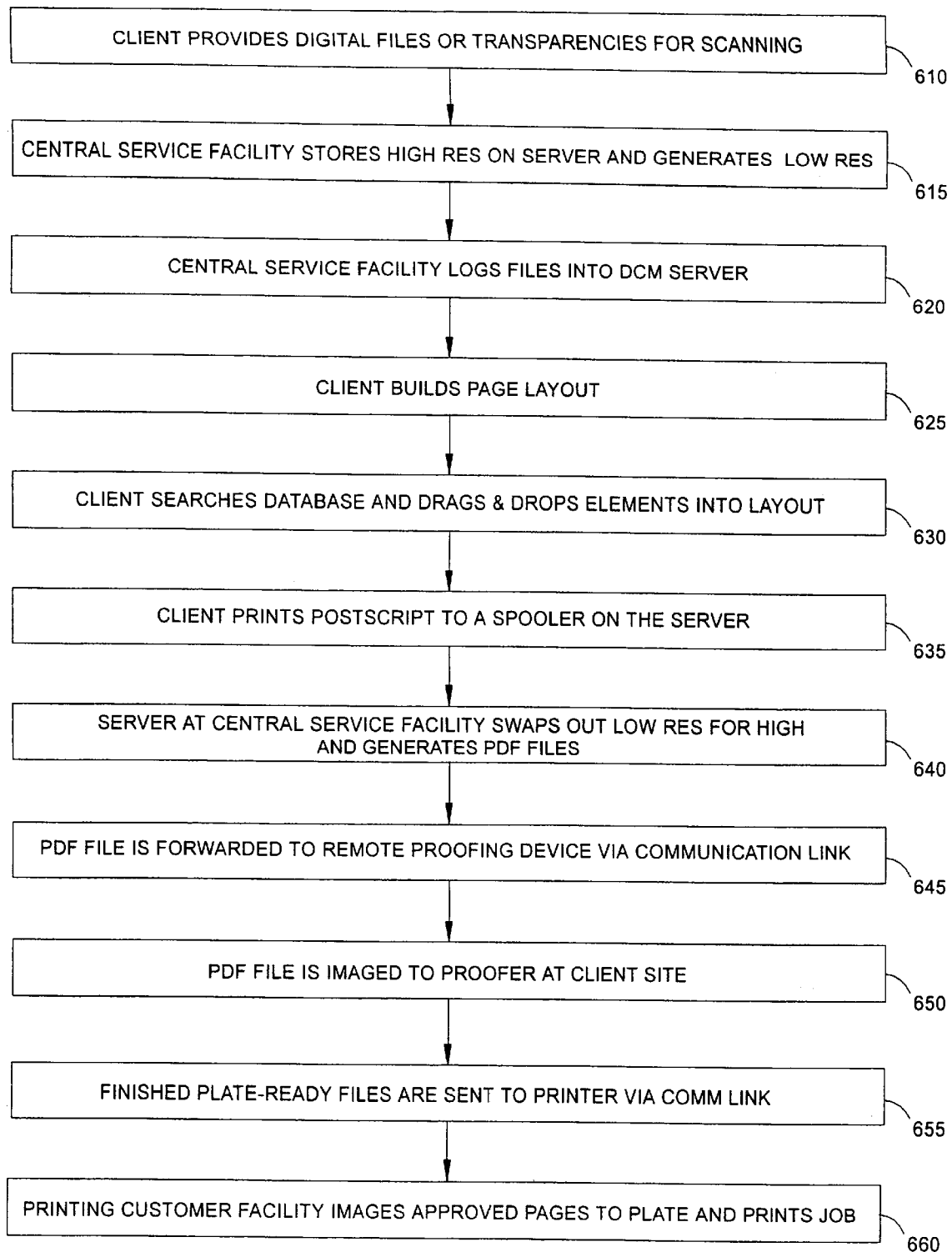
FIG. 6 is a flow chart illustrating an exemplary process of the printing and publishing system shown in FIG. 1, where prepress operations are performed at the end user facility.

FIGS. 6 through 8 illustrate exemplary process flows of different embodiments of printing and publishing system 100. In particular, FIG. 6 is a flow chart illustrating operations performed utilizing printing and publishing system 100, where prepress operations are performed at end user facility 300.

At step 610, a client, such as, end user facility 300, provides digital files or transparencies for scanning to central service facility 105. At step 615, central service facility 105 stores high resolution image files (e.g., graphics files)on server 110 and generates low resolution image files. At step 620, central service facility 105 logs files into DCM system 130. The client builds page layout using, for example, desktop computer 320 at step 625.

At step 630, the client communicates with DCM system 130 to search its database and drag/drop elements into layout from the electronic files in low resolution format stored at central service facility 105. Once the client completes the design of the layout, the client prints a Postscript file to a spooler on server 110 at step 635. Server 110 swaps out low resolution files for high resolution files and generates a PDF file at step 640. The PDF file is forwarded to a remote proofing device, such as, digital color proofer 330 or laser printer 340 via a communication link at step 645. At step 650, the PDF file is imaged to the remote proofing device at end user facility 300.

At step 655, finished plate-ready files are sent to printing company facility 400 via a communication link, such as, private network 160 or public network 190. Printing company facility 400 images approved page layouts to a print at step 660 and prints the pages.

Figure 7A:
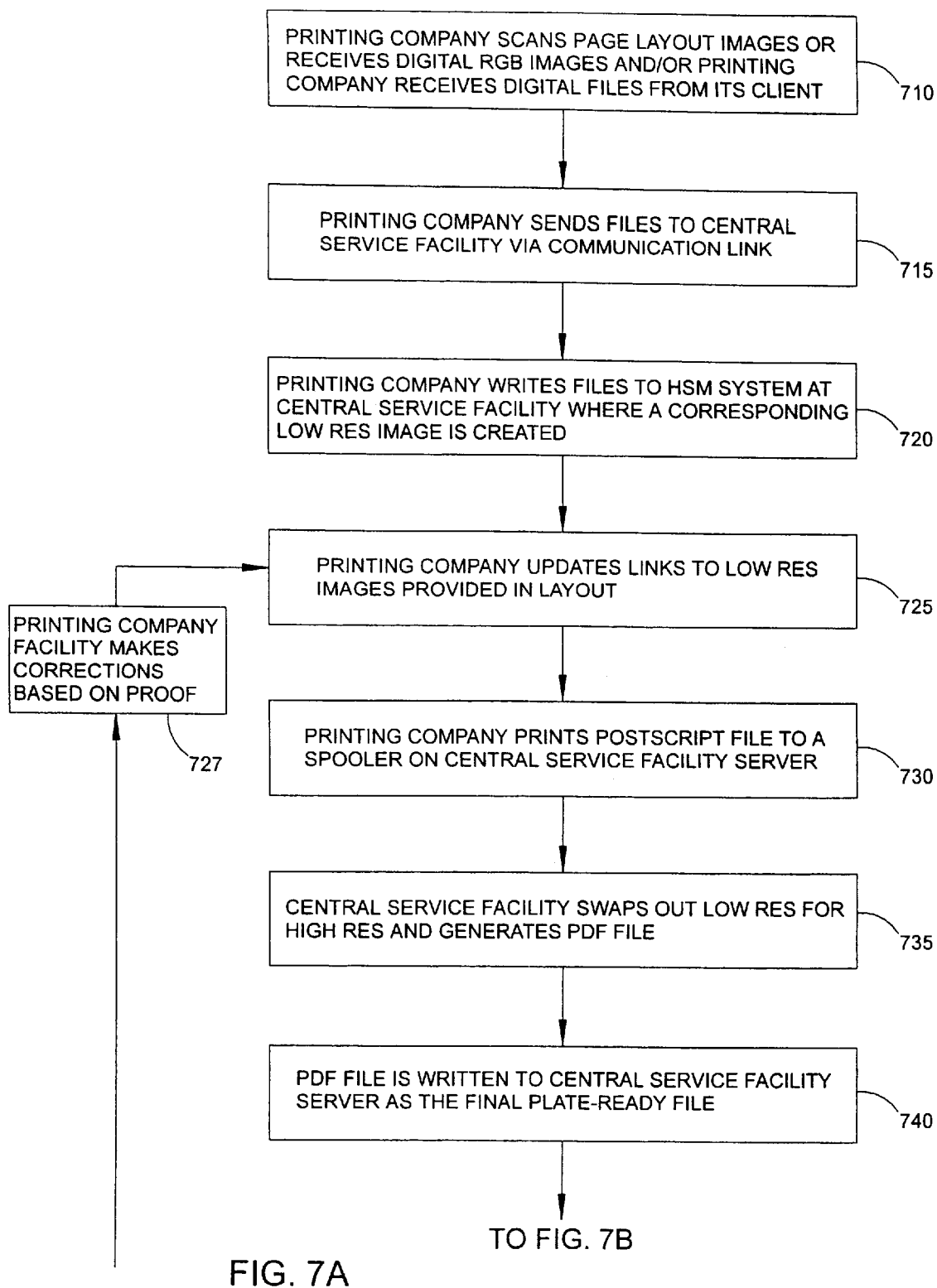
FIGS. 7A and 7B are a flow chart illustrating an exemplary process of the printing and publishing system shown in FIG. 1, where prepress operations are performed at the printing company facility.
Figure 7B:
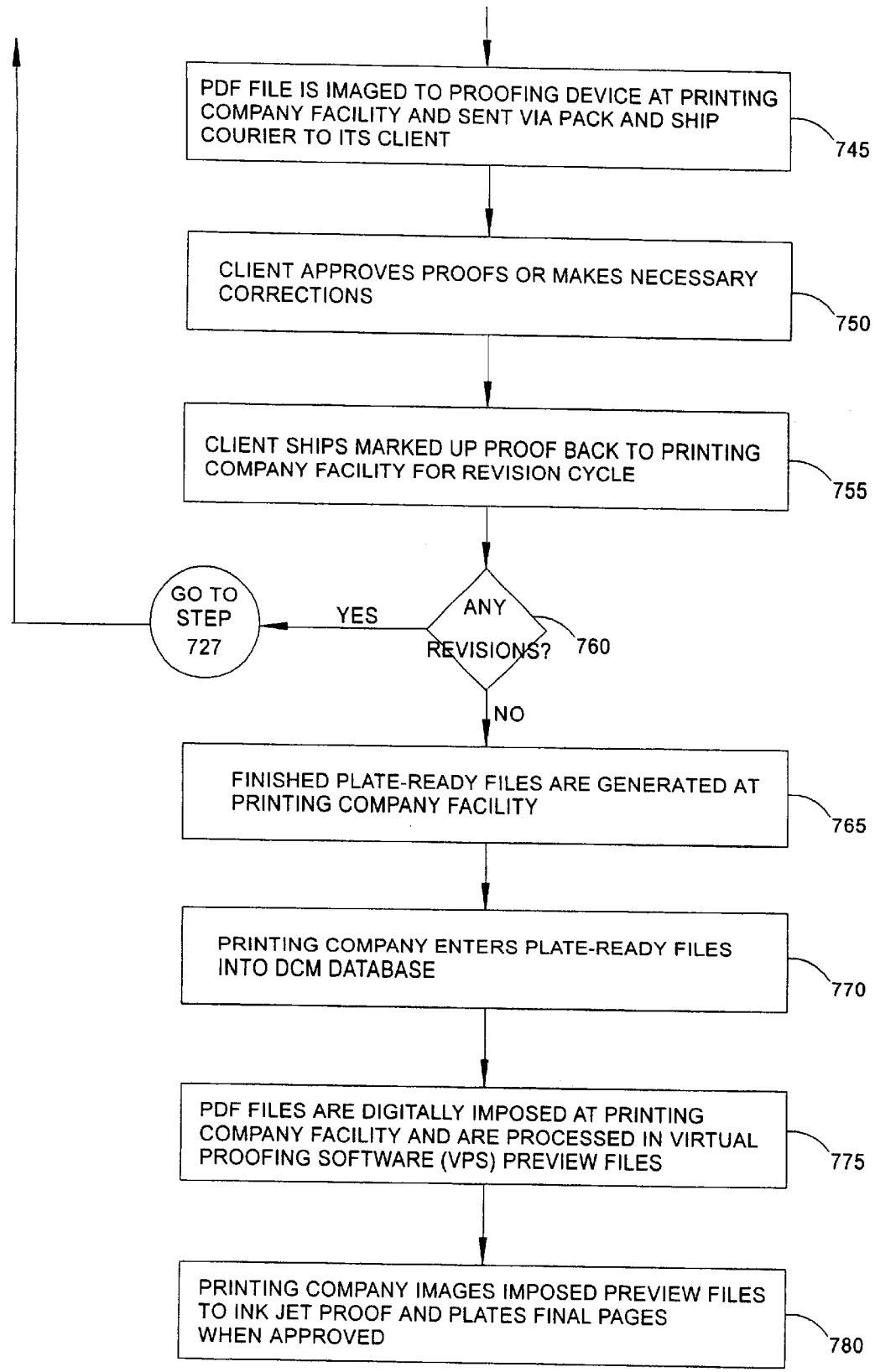

FIGS. 7A and 7B are a flow chart illustrating operations utilizing printing and publishing system 100 where prepress operations are performed by printing company facility 400. In particular, the exemplary operations illustrated in FIGS. 7A and 7B provide for the situation where the page layout designer is not a subscriber to printing and publishing system 100.

At a step 710, printing company facility 400 scans page layout transparencies or receives digital RGB images and/or printing company facility 400 receives digital files from its client. At step 715, printing company facility 400 sends files to central service facility 105 via communication link and network, such as, private network 160 or public network 190. At step 720, printing company facility 400 writes the files to HSM system 120 at central service facility 105 where a corresponding low resolution image is created.

Printing company facility 400 updates links to low resolution images provided in page layout at step 725. At step 730, printing company facility 400 prints a Postscript file to a spooler on server 110 at central service facility 105. Central service facility 105 swaps out low resolution images for high resolution images and generates a PDF file at step 735. At step 740, the PDF file is written to server 110 at central service facility 105.

At step 745, the PDF file is imaged to a proofing device at printing company facility 400. The proof is then sent via a pack and ship courier to the printing company client. At step 750, the client approves the proofs or makes necessary corrections. The client ships the markup proof back to printing company facility 400 for any revisions at step 755. At decision 760, if any revisions are necessary, step 727 is performed in which printing company facility 400 makes corrections based on the proof returned from its client. After step 727 steps 725, 730, 735, 740, 745, 750, and 755 are performed.

If no additional revisions are necessary, step 765 is performed in which the finished plate-ready files are generated at printing company facility 400. At step 770, printing company facility 400 enters plate-ready files into DCM database 132. At step 775, PDF files are digitally imposed at printing company facility 400 and are processed into virtual proofing software (VPS) preview files. VPS preview files provide a digital soft proof which provides for review of content of the PDF file. VPS preview files are approximately 300 dpi (dots per inch). At step 780, printing company facility 400 images impose preview files to ink jet proof and plates final pages when approved.

Figure 8A:
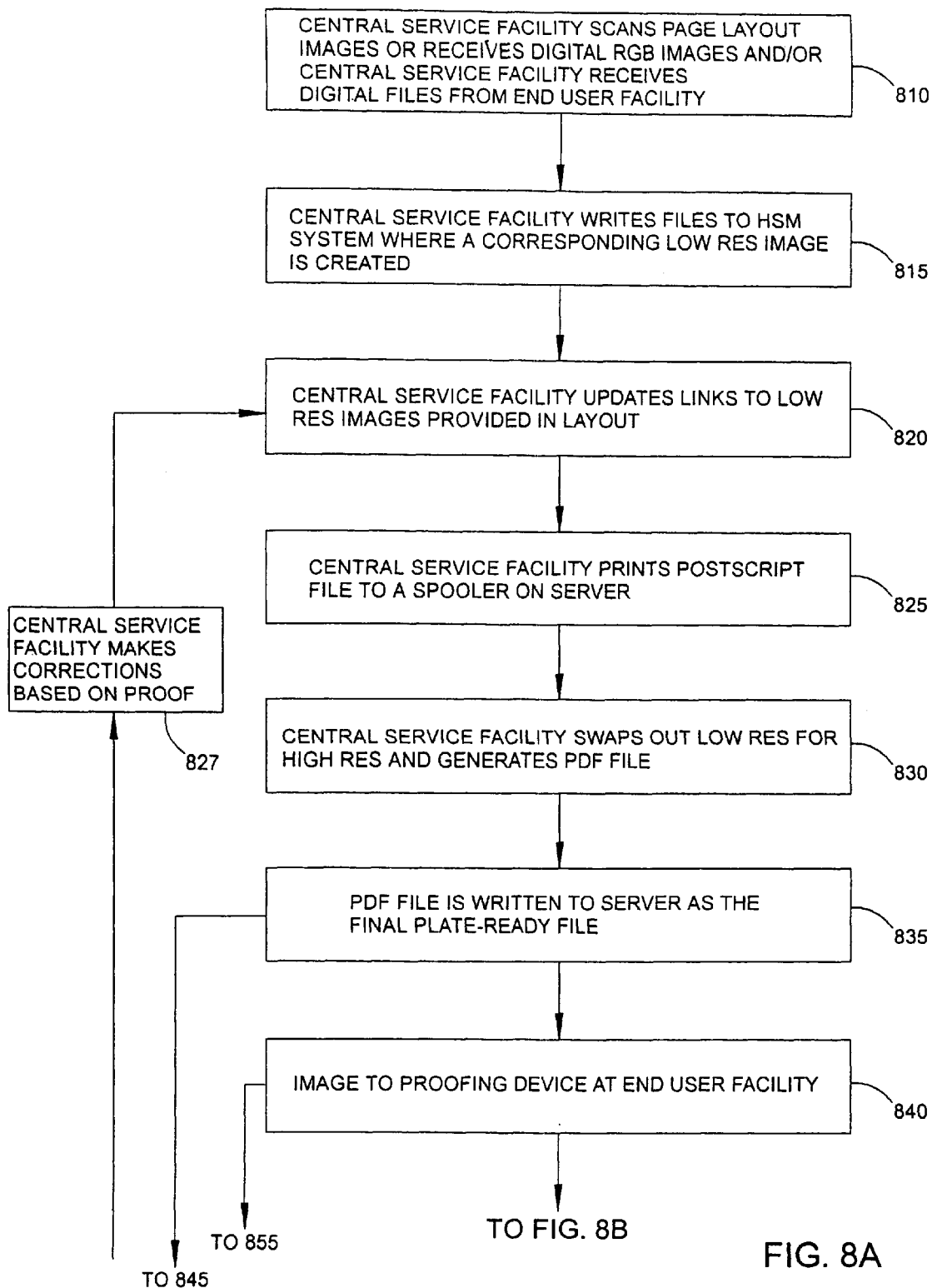
FIGS. 8A and 8B are a flow chart illustrating a second exemplary process of the printing and publishing system shown in FIG. 1, where prepress operations are performed at the central service facility.
Figure 8B:
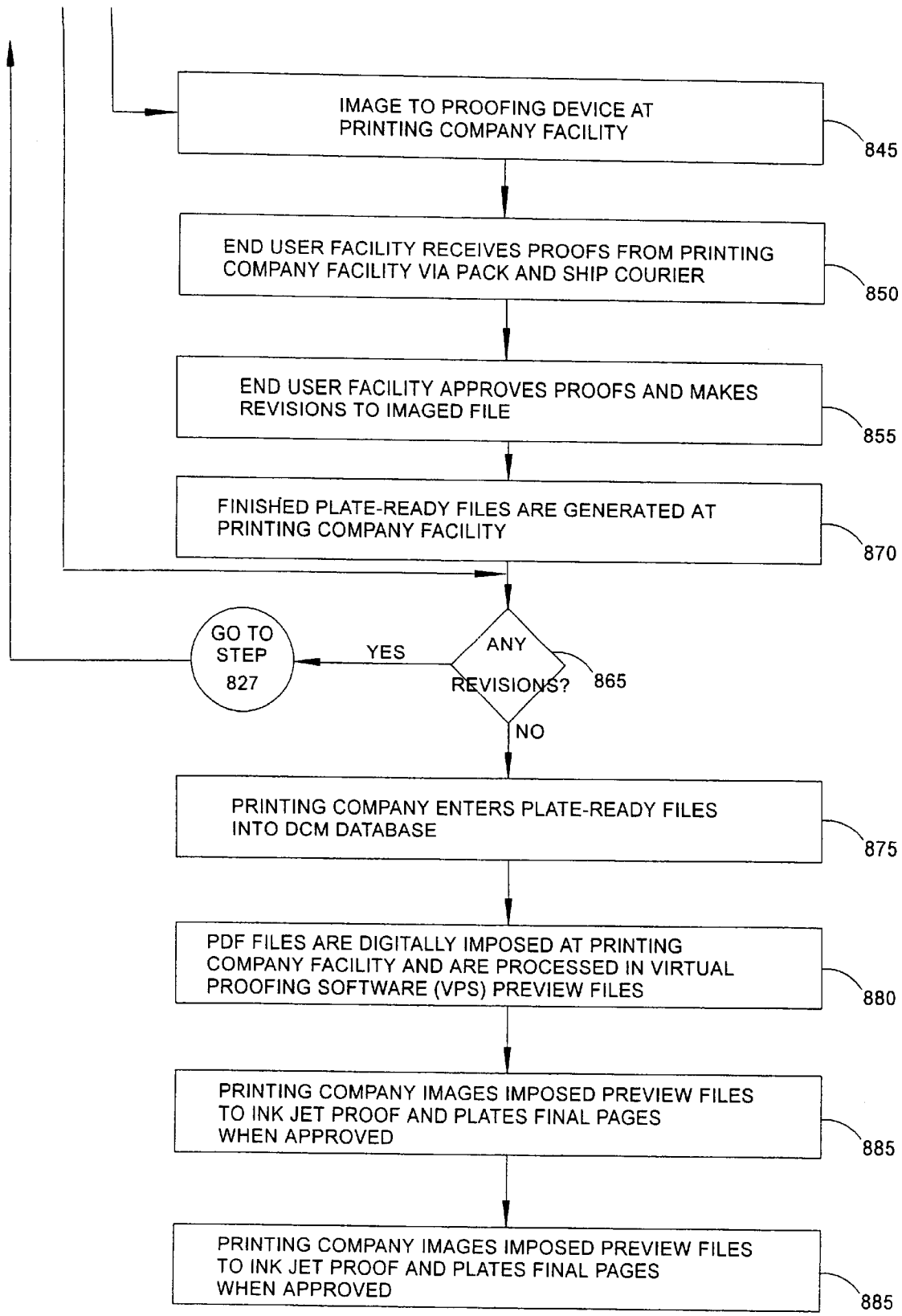

FIGS. 8A and 8B are a flow chart illustrating operations utilizing printing and publishing system 100 where prepress operations are performed by central service facility 105. In particular, the exemplary operations illustrated in FIGS. 8A and 8B provide for the situation where the page layout designer is a subscriber to printing and publishing system 100, such as, end user facility 300.

At a step 810, central service facility 105 scans page layout transparencies or receives digital RGB images and/or central service facility 105 receives digital files from end user facility 300 via a communication link. At step 815, central service facility 105 writes the files to HSM system 120 where a corresponding low resolution image is created.

Central service facility 105 updates links to low resolution images provided in page layout at step 820. At step 825, central service facility 105 prints a Postscript file to a spooler on server 110. At step 830, central service facility 105 swaps out low resolution images for higher resolution images and generates a PDF file. At step 835, the PDF file is. written to server 110.

After step 835, either step 840 or 845 is performed. Step 840 includes the imaging of the Postscript file to a proofing device at end user facility 300. Step 845 includes imaging the Postscript file to a proofing device at printing company facility 400. If step 845 is performed, step 850 is performed where end user facility 300 receives proofs from printing company facility 400 via pack and ship courier. After step 850 is performed, if at all, a step 855 is performed in which end user facility 300 approves proofs or makes necessary corrections to the page layout file.

At step 860, end user facility send a marked-up digital proof back to printing company facility 400 for revision cycle. At decision block 865, if there are any revisions, a step 827 is performed in which central service facility 105 makes corrections based on the marked-up proof. After step 827, steps 820 through 860 are performed.

If no additional revisions are necessary, step 870 is performed in which finished plate-ready files are made available to printing customer facility 400 via communication link. At step 875, printing company facility 400 enters plate-ready file into DCM database 130. At step 880, plate-ready files pages are digitally imposed and imaged to proofing device at printing company facility 400. At step 885, printing company facility 400 images the proof pages to plate and prints the job.

Figure 9:
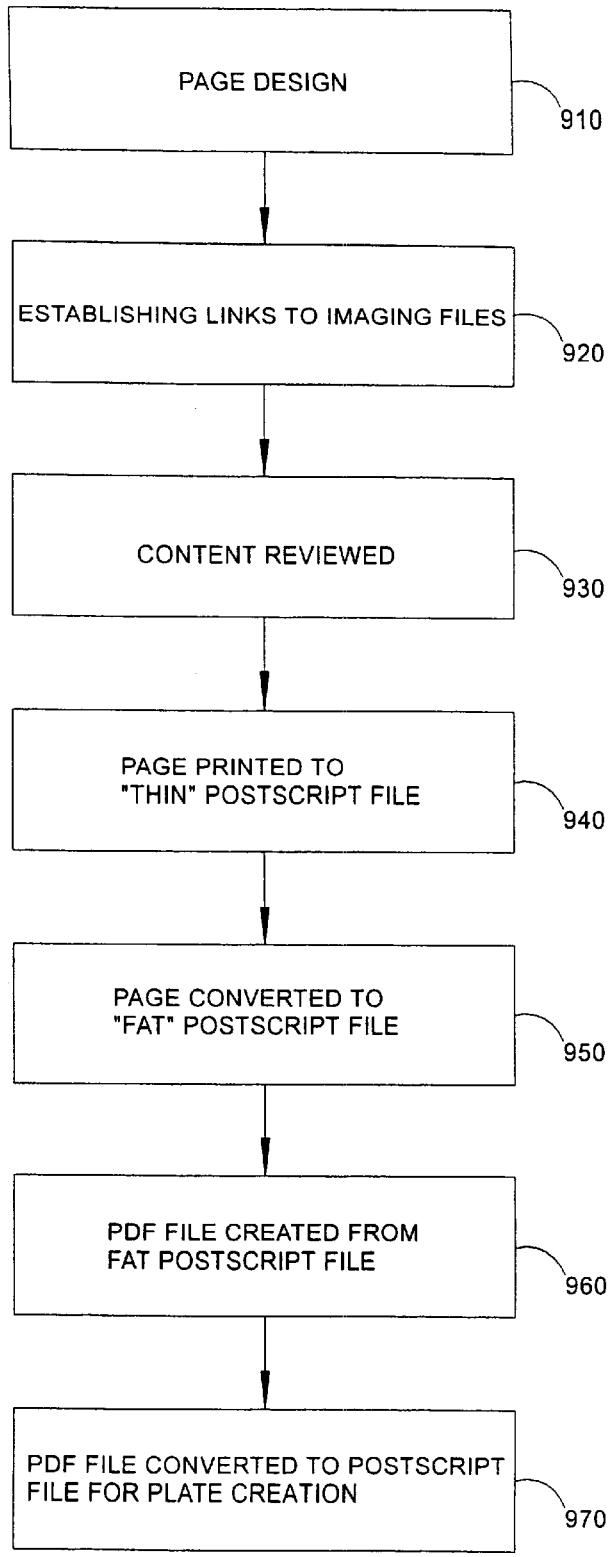
FIG. 9 is a flow chart illustrating an exemplary production workflow of the printing and publishing system shown in FIG. 1.

FIG. 9 illustrates a exemplary production workflow of printing and publishing system 100. In particular, FIG. 9 illustrates the format changes undergone throughout the workflow of printing and publishing system 100. At step 910, using a page layout application, such as, QuarkXpress, end user facility 300 performs page design. At step 920, page layout application establish links to other art and imaging files on central service facility 105. At step 930, once the page is built, content is reviewed using a black and white laser printer.

At step 940, end user facility 300 prints the page to a "thin" Postscript file at central service facility 105 with OPI comments imbedded. The Postscript file is called "thin" because it contains low resolution images. At step 950, the thin Postscript file is dropped into a "hot" folder on server 110, which parses the thin Postscript file, pulls out the OPI data, and replaces it with high resolution data. Once the page includes high resolution data, it is considered to be in "fat" Postscript format.

At step 960, the fat Postscript file is distilled to a PDF and written to the customer storage volume and to the remote proofing device. PDF files are used to generate digital proofs remotely because PDF incorporates a low level compression algorithm that allows for more efficient transmission over telecommunication lines.

Once the page has been approved for imaging to plate, at step 970, the PDF files are converted to a Postscript format for purposes of plate output. PDF is considered a Postscript 3 format. Conventional hardware and software infrastructure is unavailable to accept PDF, but rather accepts Postscript level 2. Thus, PDF must be converted from Postscript 3 to Postscript level 2.

Figure 10:
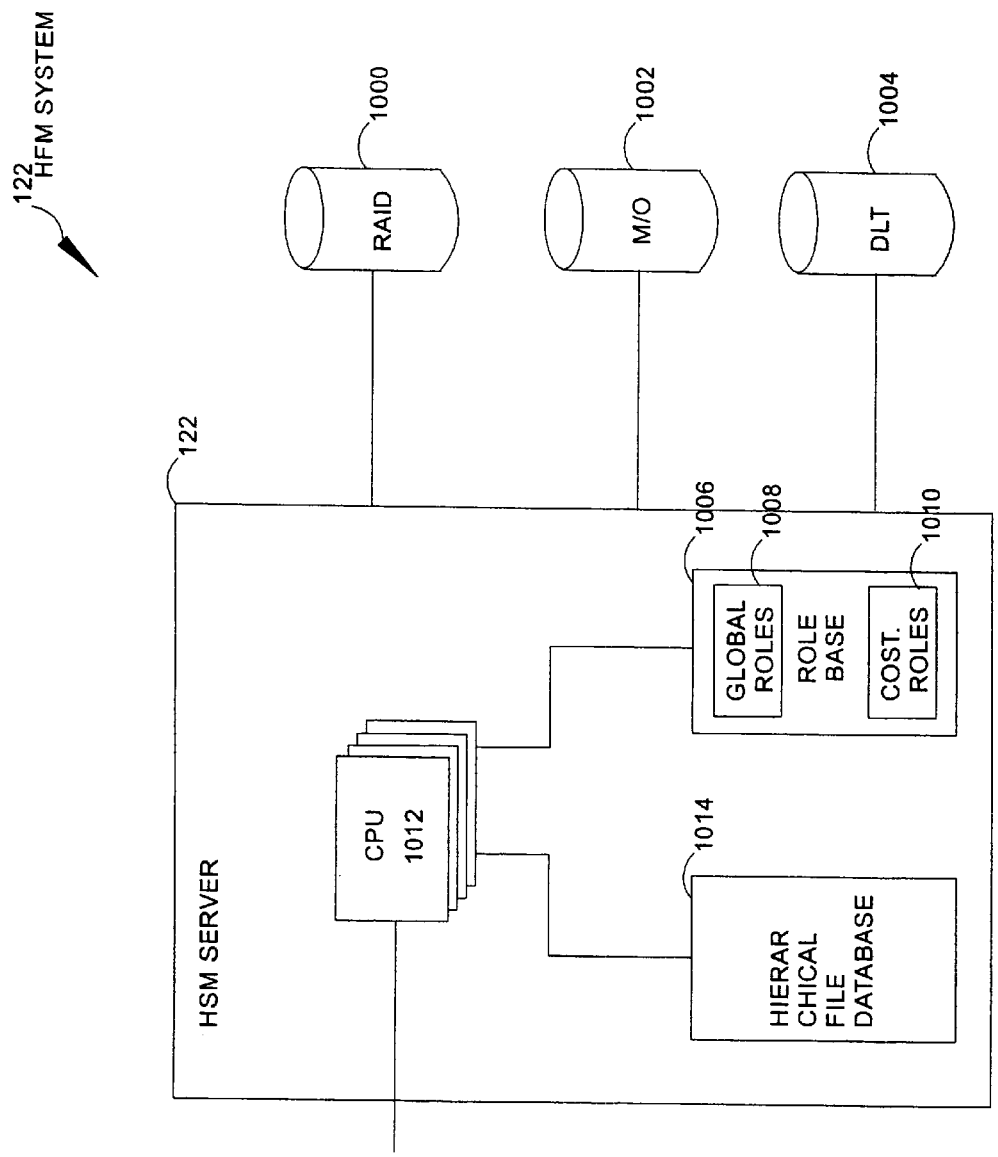
FIG. 10 is a block diagram of the hierarchical storage management system (HSM) of the central service facility of FIG. 3.

FIG. 10 illustrates the HSM system 120 in more detail. HSM system 120 includes HSM server 122 which is coupled to and communicates with server 110. Server 110, in turn, is coupled to and communicates with local network 150. In this manner, HSM system 120 is coupled to and communicates with local network 150. HSM server 122, in turn, is coupled to and communicates with RAID 1000, magneto-optical jukebox 1002, and DLT jukebox 1004. Of these three storage devices, RAID 1000 has the fastest access time and is the first tier of storage. Magneto-optical jukebox 1002 has a slower access time and is a second tier of storage. DLT 1004 has the slowest access time and is the third tier of storage.

HSM server 122 serves three primary functions: first, it receives requests for customer files, typically from DCM system 130, and retrieves those files from the three storage devices 1000, 1002 and 1004. Second, it stores files to the storage device 1002, 1004, 1006. Third, it manages the allocation of space on each of the storage devices and periodically moves files from one tier of storage to another tier based on a set of internal rules. These internal rules are stored in a rule base 1006 in HSM server 122. These internal rules include both global rules 1008 and customer rules 1010. The rule base 1006 is accessed by CPU 1012 to determine whether the current tier of storage is appropriate for a particular file. For example, global rules 1008 may include rules that determine storage based on file size, last access time, or file type (for example, if the file is a page layout application program document, a high resolution graphic document, a low resolution graphic document, or a thumbnail).

The customer rule base is actually a collection of rule bases one provided for each of the customers that use the system. The customers when used in this sense, include the end users and the printing company in charge of the printing company facility. Customer rules determine storage similarly on file type, file size, and last access date. In addition, customers may have particular concerns for the access time of their files, and thus may have additional rules specific to their operations. For example, in a preferred embodiment, it is desirable to have high resolution graphic files used for the creation of printing plates to be stored in the second or third tier of storage, the M/O jukebox and the DLT jukebox since these items are not accessed often, and may have rules that keep thumbnails and low resolution versions of the high resolution image files in tier one and tier two storage, the RAID 1000 and the M/O jukebox 1002. In this manner, the high resolution graphic files that are accessed by the plate production process, described elsewhere herein, can be stored in a device having a greater access time. Further, the low resolution graphic file equivalence of those high resolution graphic files can be stored in a faster access time medium. As such, the end users personnel that create the QuarkXpress documents can access the low resolution image for creating Quark documents from a low access time storage media while permitting the not-so-time-critical platemaking process (described elsewhere herein) to access the high resolution equivalence of those low resolution graphic files from a high access time storage device.

HSM server 122 also includes a hierarchical file database 1014 that is provided to locate and identify all the customers' files. The hierarchical file database 1014 is accessed by CPU 1012 when a file retrieve or a file store request is made of hierarchical HSM system 120. The hierarchical file database (HFD) 1014 includes a plurality of tables that correlate each file's name, path, location on a particular storage device 1000, 1002, 1004 for each file stored in HSM system 120. In this manner, when the HSM system 120 receives a request for a file, it refers to HFD 1014 to locate the particular storage device on which that file is stored, and can then access that file and provide it to the requestor. Similarly, when the HSM system 120 receives a file storage command, CPU 1012 will access HFD 1014, create a new entry for a new file, refer to the global and customer rules on storage in rule base 1006 to determine where to store that file, and then store that file on the appropriate storage device 1000, 1002, and 1004.

Figure 11:
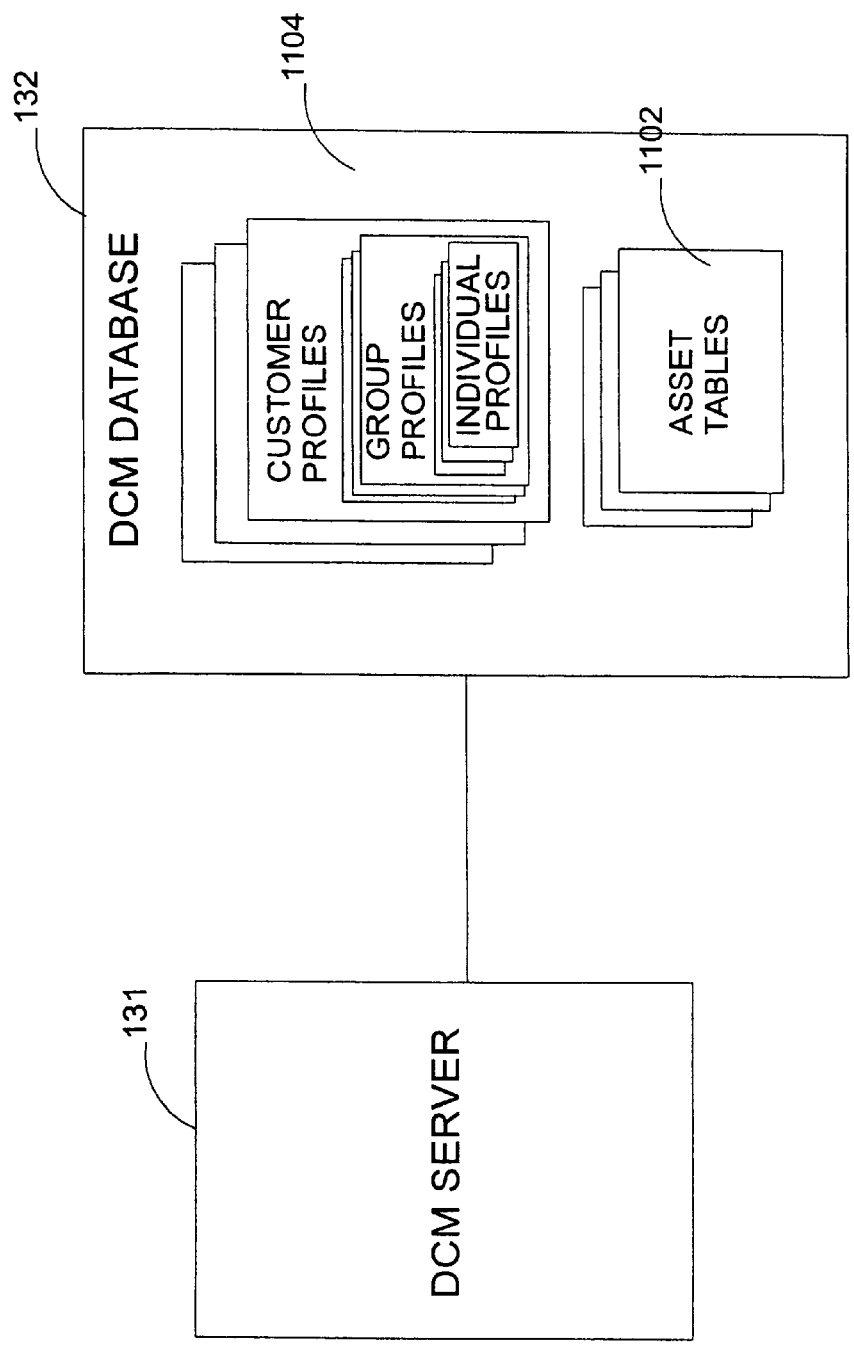
FIG. 11 is a block diagram of the digital content management (DCM) system of the central service facility of FIG. 1.

FIG. 11 illustrates a detailed view of the digital content management or "DCM" system 130. DCM system 130 includes two major subsystems, database 132 and DCM server 131. DCM system 130 performs several important functions for the central service facility. First, it controls access to customer's files. Second, it sends file access, file modification and file deletion requests to HSM system 120. When a customer of central service facility 105, whether at end user facility 300 or printer customer facility 400, or whether over public network 190, or private network 160, access central service facility 105, the access request is sent to DCM server 131. The customer will preferably use a web-browser, such as Internet Explorer or Netscape Navigator or similar products to make the initial connection to central service facility 105. This request will be sent to DCM server 131. The customer will provide DCM server 131 with access control information, for example a user name, password, machine identifier. This information may be entered by the customer at a workstation keyboard in the end user facility 300 or printer customer facility 400, or may be stored as a "cookie" at that workstation to permit automatic connection to the central service facility without entry of access control information from the keyboard.

Upon receiving this information, DCM server 131 will determine if the customer is permitted to access central service facility 105. If so, DCM server 131 will permit access but only to the extent provided by that customer's profile. DCM server 131 permits a wide variety of accounts to be created. A small client, for example, may have a multiple account for everyone at that customer's end user facility 300 or printer customer facility 400. Larger customers may have multiple accounts (and hence a single account username and password) for each department. Even larger customers may have an account per each individual employed by the customer. The arrangement chosen by the customer will depend on their particular needs and level of security concerns.

Each different user account has an associated profile. These profiles determine such things as the type of files that may be access at central service facility 105, the time files may be accessed at central service facility 105, and the access each account has to particular programs at central service facility 105. For example, a field representative of the customer who is responsible for selling customer's products, may merely be able to browse the files to see what kind of products are available. Others may have the ability to browse, download, and/or retrieve files. Some accounts may have associated within the ability to not only retrieve but to make edits to files and record those changed files back into DCM database 132.

DCM server 131 maintains the profiles in the DCM database 132 which includes asset tables 1102 and user profile tables 1104. User profile table 1104 includes a plurality of user profiles, at least one for each customer of central service facility 105. Each customer profile, in turn, can be broken down into group profiles, for example, departmental profiles for marketing, manufacturing, sales staff, and outside customers, or clients; and individual profiles, for example, individuals who prepare printed documents, individuals who must review prices, and individuals who must approve catalog or advertising copy. Thus, each customer may have a plurality of group profiles, and each of those group profiles may have a plurality of individual profiles. Each nested category of profiles is inherited. For example, an individual profile inherits the profile of the group to which he is assigned and the group inherits the profile of the customer to which he is assigned. These profiles can be remotely edited by a customer administrator, for example, at end user facility 300 or printing company facility 400.

The user profiles, both at the customer, group and individual levels, include rules that permit access to files to be controlled. For example, these rules can permit files to be retrieved, saved or edited. File access permissions can be granted on the basis of file size, file date, file type and location of the file in the customer's hierarchical file data space established by hierarchical file database 1014 of HSM system 120. In addition, and of particular benefit to a central service facility for publishing and printing services, the rules may control access based upon file content, for example, whether the file contains graphical information, textual information or whether the file is a page layout application program template document, such as a PageMaker, or QuarkXpress document.

User profiles also include presentation rules that govern the manner in which the data managed by DCM system 130 is presented to the customer. For example, rules are provided that indicate the type of file access tool used by the customer or the quality or speed of the data connection. For example, certain customers, groups or individuals may communicate over a slow communications link and hence would not have access to large high resolution images which bog down the communications link. As another example, these profiles may indicate the type of browser or access tool employed by the customer and limit the information to the customer to files that can be properly displayed by the software at the customer's facility.

Finally, the profiles may establish access based upon permitted or non-permitted attributes of the files that are maintained in the asset tables. For example, a group profile is created for outside vendors that includes rules limiting their access to tables indicating the price of products but permitting them to see attributes in the asset tables regarding the availability of certain products. In another example, a marketing management group could be created with profiles that permit access to view catalogs (typically stored as page layout files with links to graphics and textual information represented in the page layout file) but not permit members of the market manager group to edit the catalog itself, that privilege being limited to the customer's personnel who are responsible for creating the catalog.

Regarding asset tables 1102 in DCM database 132, data is stored in these tables as metadata. Metadata includes file properties, data attributes and history information regarding the files themselves. File properties are maintained and updated automatically by DCM system 130, whenever a file is saved, retrieved, created or otherwise accessed. File properties include such data items as file size, file type, resolution and physical size (for graphic files representative of drawings and photographs). The second class of metadata stored in the asset tables include file attributes, such as cost, SKU, product name, model number, part number, vendor, volume discounts, product availability, product manufacturer and price, of the product shown (if the file is a graphics file) or described (if the file is a textual file) for each such graphic or text file maintained in the DCM database 132. This information is of particular value in creating advertising literature or catalogs. With these links established in DCM system 130, the system can automatically insert a price, product name, model number or other data into the catalog associated with a particular picture of that product when advertising literature, catalogs or brochures are created.

Another type of attributes maintained in DCM system 130 relates to the use of a file. For example, graphical files (e.g., pictures and drawings) and text files (e.g., advertising copy, product descriptions, product names or the like) are associated with data indicative of a particular printed document in which they have been inserted. This data may reflect the publication date, the publication location, the printer that printed the data or the date or series of documents in which they were printed. For example, if a photograph was previously used in a "Spring 1995 Sales Catalog" distributed in the winter of the preceding year, this catalog identifier (Spring 1998 Sales Catalog or similar information) would be associated with that file. In this manner, a person assembling a catalog or advertising material can readily identify the files (either graphical or textual) that were used previously, and how they were used.

The attributes associated with a file-recorded in DCM database 132 will also include data indicative of the creative source and legal status of the file. This data will include such attributes as (in the case of graphical files) the artist who made the drawing, the photographer who photographed the drawing or otherwise converted it into digital form, data indicative of the ownership of the copyright, both of the original graphic and the person who converted it into digital form, data indicative of the legal rights, the customer has to copy, distribute or otherwise use the file. This data includes such information as the copyright holder, data indicative of the license or assignment that permits the customer to use the file, and data indicative of any significant contractual obligations regarding those rights, such as the number of times the file has been published, reproduced or otherwise used, as well as the number of times the file can be used again under the associated contract, license or assignment identified by the data indicative of legal rights.

Tables in DCM database 132 also include attributes that relate the particular file to other, associated files. These associated files would include (in the case of graphical files) an attribute indicative of a text file that describes the item or items illustrated in that graphical file. This association capability is of particular importance in laying out brochures, catalogs or other advertising materials, in which both images and associated text are disposed on a page or pages of these advertising materials in an associated arrangement. For example, in catalogs it is routine to provide a photograph of a product in association with a textual description of that product. In this manner, by associating a graphic file with a textual file, an individual laying out the catalog or other advertising materials can select both an image of a product and one or more textual descriptions of that product for insertion in proximity to each other without having to do a full text search of many text files for a SKU number or product number. Similarly, a plurality of graphics files, all illustrating the same product or item can be linked in this manner or a plurality of text files, each describing the same item or product can be similarly linked. In this manner, a graphic artist laying out the catalog, brochure or other advertising material can easily search for and retrieve a list of graphics or textual files describing a single product to permit easy examination of and selection between for insertion into catalogs, brochures or other advertising material. The method of searching is described below.

Finally, the metadata stored in the asset tables include fields indicative of file historical information for each of the files stores in DCM system 130. This data includes such information as dates and times of access for each file, types of access (read, write, revise or create), and the person (e.g., the account number, individual, group or customer number identifier) who performed these file accesses.

The end user accesses central service facility 105 by connecting over private network 160 preferably using an ATM transport protocol or public network 190, such as the Internet. When private network 160 is used, the end user's workstation is preferably configured to show the customer's files on a central service facility's HSM system 120 as a drive icon appearing on the screen of the workstation. Since the network is private, log-on procedures may or may not be required and the user may treat HSM system 120 as another drive for the storage and retrieval of files. DCM system 130 does not mediate these communications.

Figure 17:
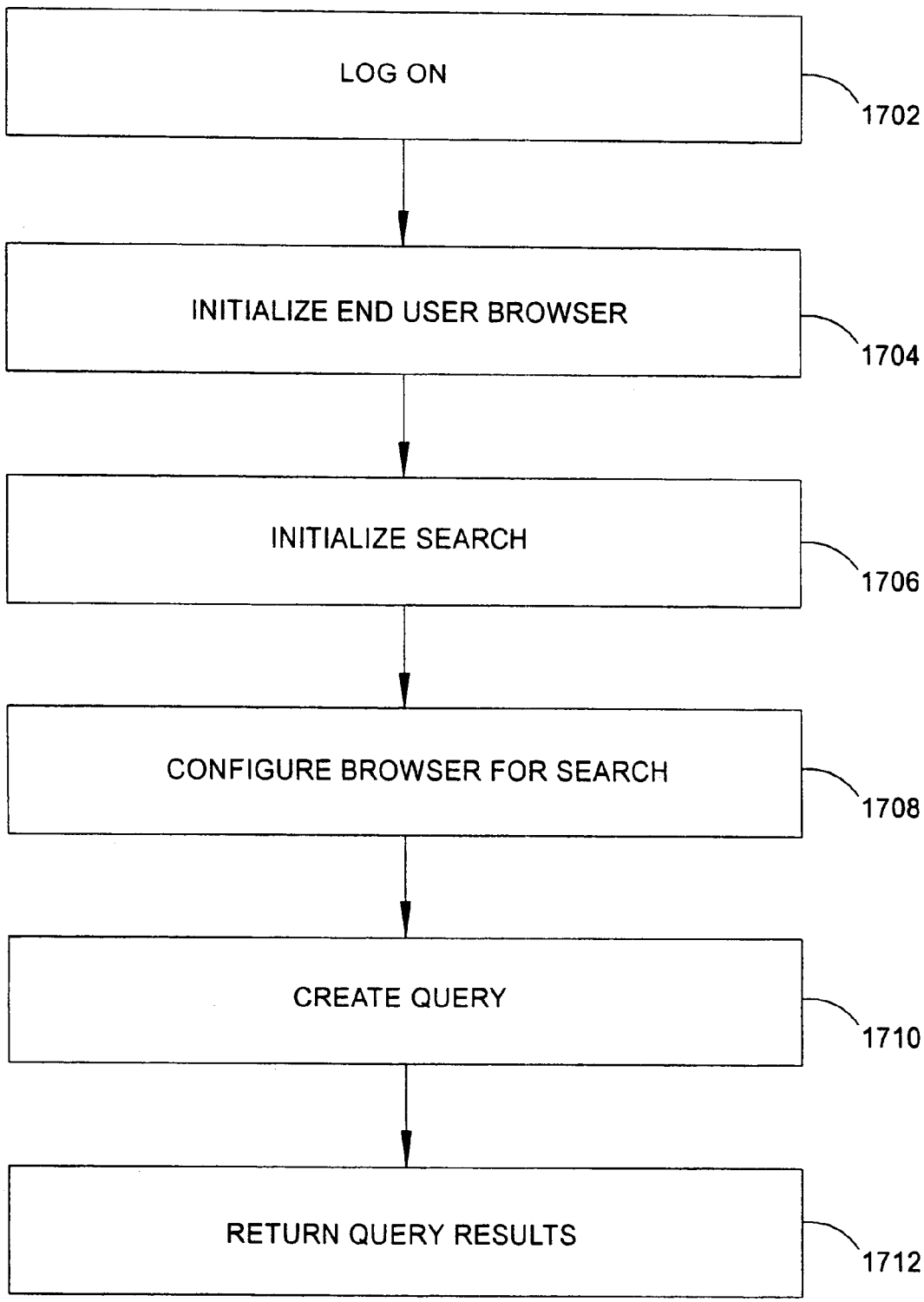
FIG. 17 illustrates a method of connecting to the central service facility, and searching for files on the DCM.

Alternatively, central service facility 105 can be coupled to an end user over public network 190, such as the Internet. In this second access mode, as shown in FIG. 17, block 1702, the end user makes the initial contact with central service facility 105 using an Internet browser, such as Internet Explorer or Netscape Navigator and entering the Uniform Resource Locator (URL) of central service facility 105 in the browser's address location box. This URL or domain address name connects the end user to DCM system 130. DCM system 130, in turn, transmits a hyper-text document to the end user over the Internet. This hyper-text document is preferably a form, and includes blanks for user name and password. Once the end user enters this information and transmits it back to the central service facility, the central service facility, and DCM server 131, in particular, verifies the user name and password with account information stored in the user profile. If there is no correspondence between the user name and password provided by the end user the central service facility, and the DCM server 131, in particular, will not verify the end user access to the central service facility. If there is correspondence between the user name and password provided by the end user and corresponding account established in the user profile, the DCM server 131 will grant file access permission to the end user in accordance with the corresponding user profile.

In block 1704, and once the communications channel is established between central service facility 105 and the end user, DCM server 130 transmits several Java applets that configure the end user's browser in accordance with data indicative of the end user browser type stored in that end user's profile. These applets are programs that control the workstation's display and communications with DCM system 130. The applets are received and integrated into the operations of the end user's browser and the browser presents the end user with several selectable icons on the screen. These icons represent functions provided by the Java applets that were previously sent from central service facility 105 to the end user's browser. The icons are representative of functions such as browsing, searching, uploading, downloading, deleting, viewing, and editing files stored in HSM system 120 and identified in DCM system 130. By distributing these applications in the form of Java applets, the end user can, at any location, access customer data stored at the central service facility.

Figure 12:
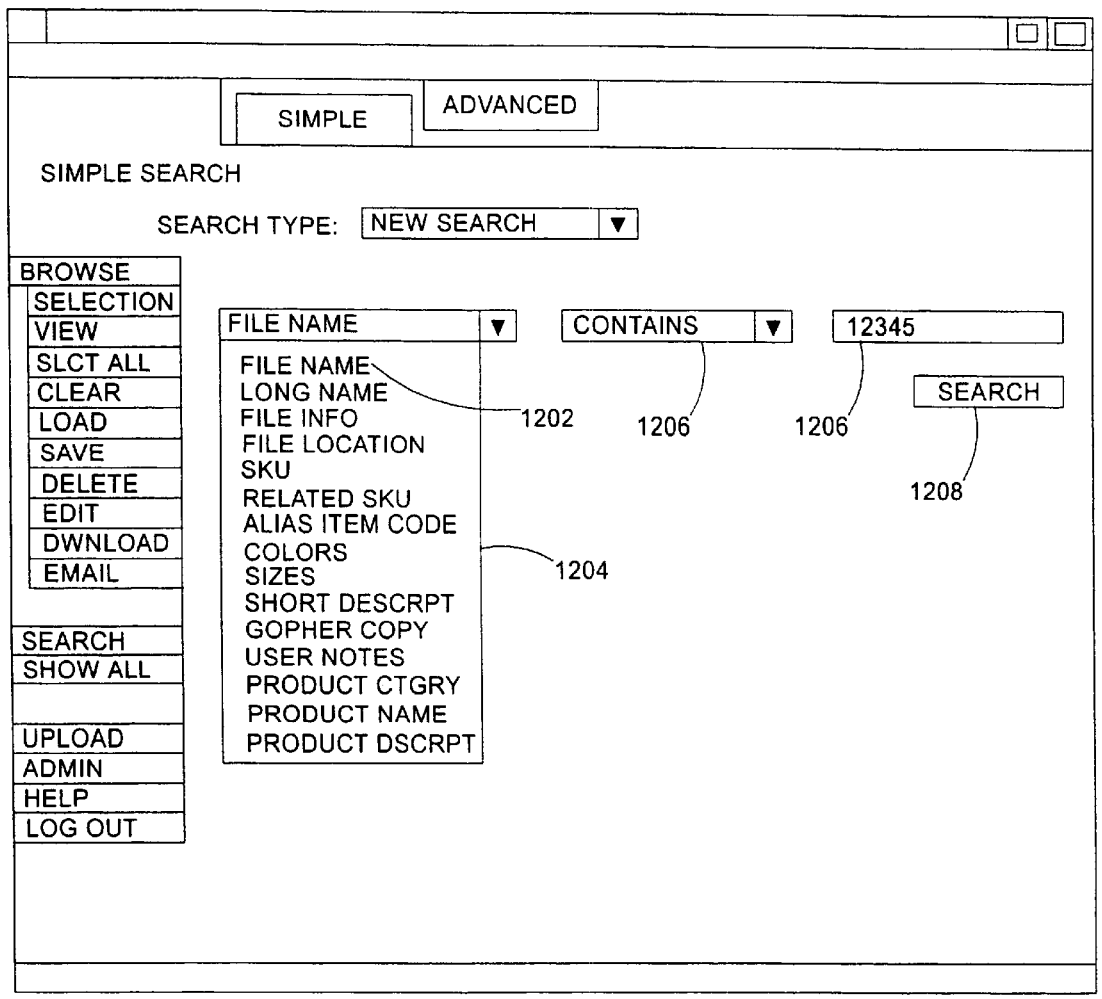
FIG. 12 is an interface page for selecting one or more attributes used for conducting a search of the DCM system of FIG. 11.

In block 1706, to locate a file, the user will select the search icon which executes the Java search sub-routine. When the search routine is executed, the Java applet communicates with central service facility 105 to identify the mode of operation of the browser. In response to the request for a search, DCM server 132 queries the user profile, and determines which tables and which attributes of those tables, that the end user is permitted to see and/or search on. In block 1708, the names of these attributes are transmitted to the end user's browser and are displayed on the screen of the end user's workstation in the form of a user selectable list box. In block 1710, the user selects one or more attributes on which he would like to search, as shown in FIG. 12, and selects an on-screen icon to perform the search. For example, in FIG. 12, the user has selected the attribute 1202 named "File Name" on which the search had indicated by the check mark next to the attribute name in the pull-down list box 1204. In an adjacent list box 1206, the Java search applet displays a plurality of search relationships, relating the attribute in DCM database 132 to be searched with a particular variable. In this case, the search relationship is "contains". Other relationships include but are not limited to "greater than" or "less than" which are typically used with metadata having numeric attributes, and "before" and "after" which are commonly used with metadata attributes containing time or date values, as well as "starts with", and "ends with"which indicate a particular location in an attribute value.

A third textbox blank 1206 is provided in which the end user can type the particular string or number to be searched for. In this case, the end user has selected the string "12345". Once the end user has finished creating a query on screen, the end user executes the search query by clicking an on-screen icon indicative of his desire to execute the search 1208. In this case the "search" icon blank is selected.

Once the query has been assembled in the foregoing manner and executed, the Java applet, in response to the selection of the "search" icon, sends the search to DCM server 131 which converts the on-screen search into a standard query language form, such as SQL. As a part of that processing, DCM server 131 queries the user profile to determine whether the end user is permitted to search on these attributes, and which if any, database records or assets in DCM database 132 match this query that the end user is permitted to see.

Figure 14:
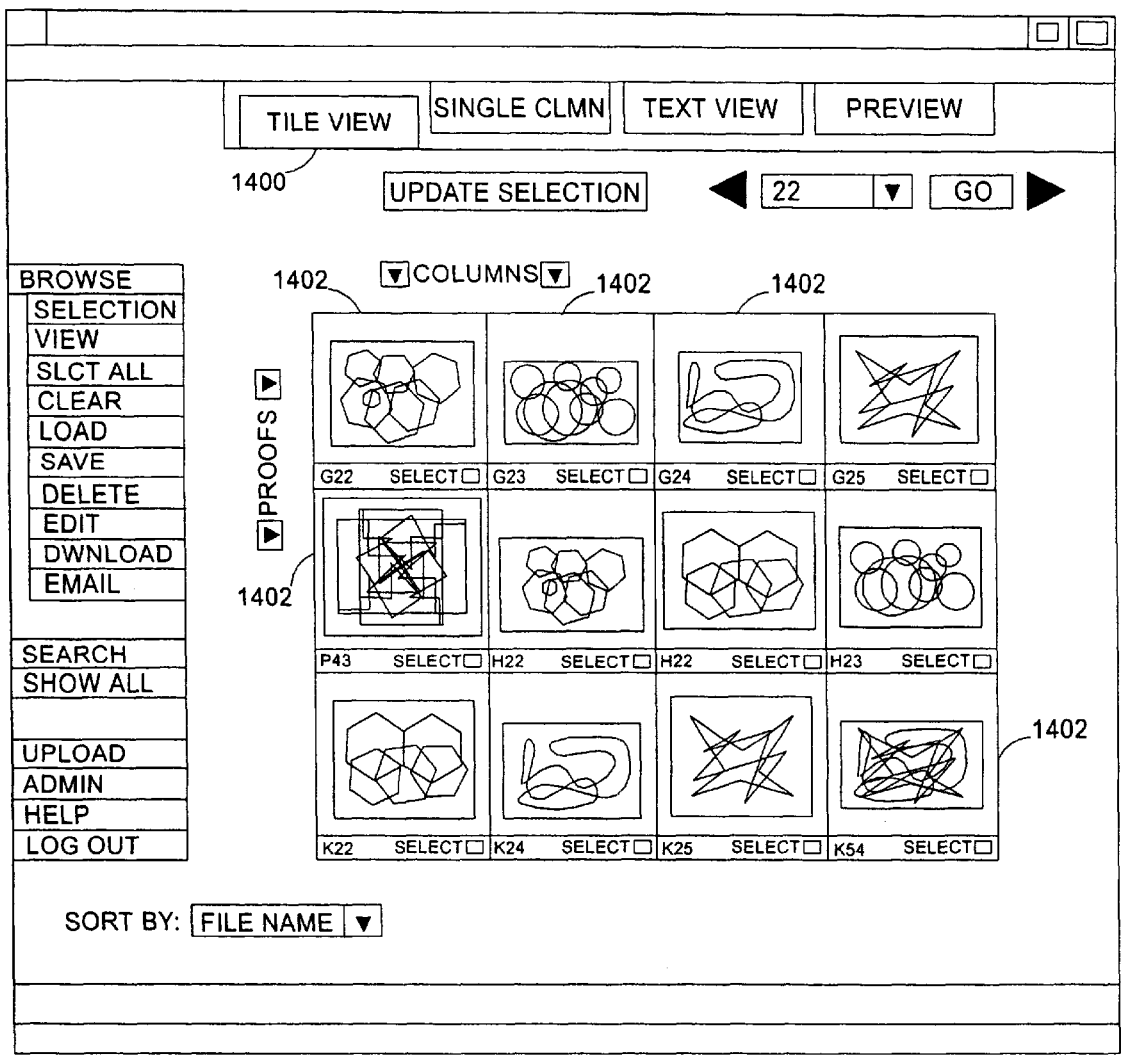
FIG. 14 is an interface page for displaying a "tile" view of search results identified by attributes in the search of the DCM system of FIG. 11, including a thumbnail representation of the graphics file identified by the search.
Figure 15:
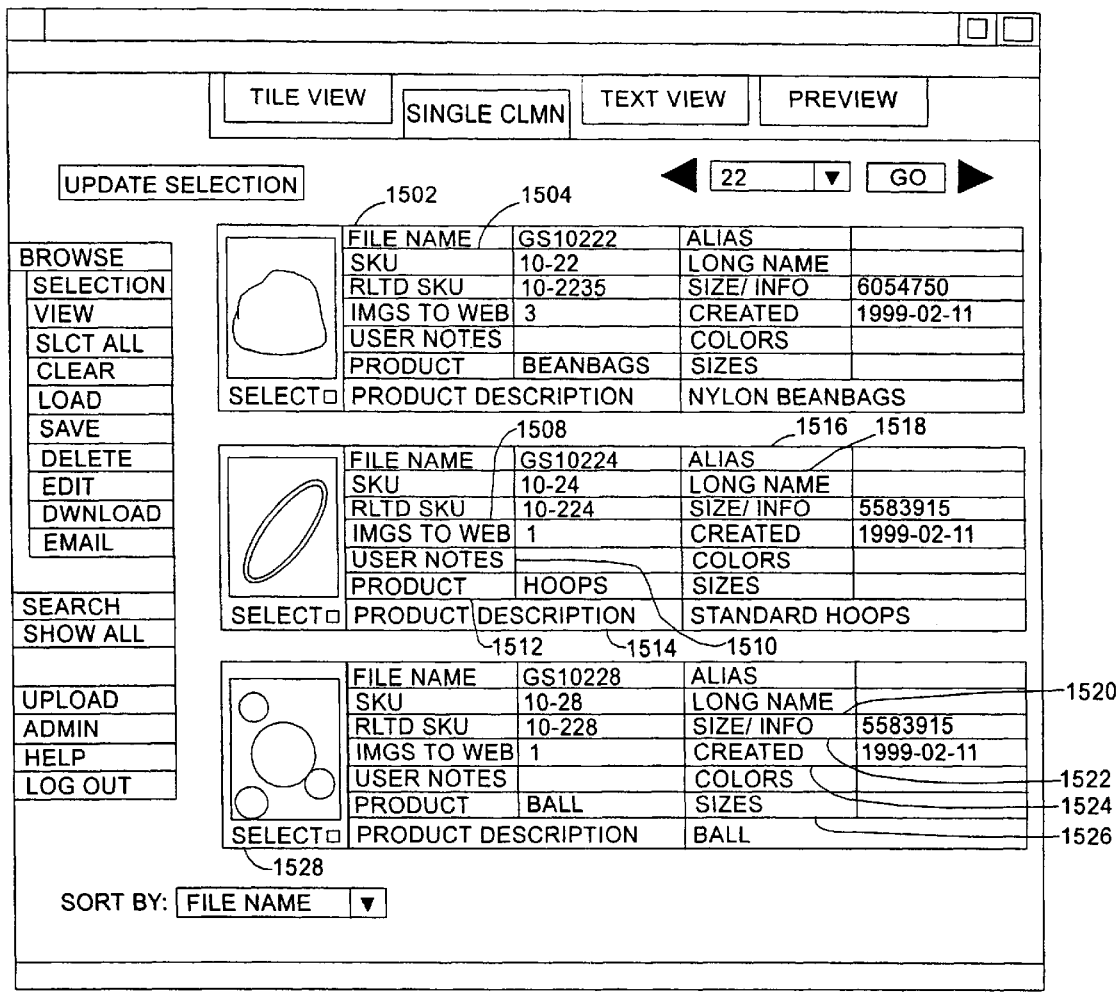
FIG. 15 is an interface page of a search result after an exemplary search of the DCM system of FIG. 11, including metadata and a thumbnail representation of the associated graphics file.

In block 1712, assuming the end user is permitted to view the results of the search, DCM server 131 then prepares the search results and returns them to the end user in several different forms. For example, as shown in FIG. 14, if the user has selected a "tile view" 1400 DCM server 131 returns a thumbnail representation 1402 of the graphics file identified by the search together with a file name. These thumbnail graphics are a very low resolution version of the graphic file stored on DCM server 131 and, thus, are particularly well suited to be transmitted over a slow communications network with minimal use of bandwidth. Alternatively, if the user has selected that the "single column view", DCM server 131 returns a thumbnail representation of the graphic file located by the search together with a plurality of attributes associated with that graphic file. The attributes are identified by attribute name and the metadata associated with those attributes. For example, in FIG. 15, DCM server 131 returns the attributes of file name 1502, SKU 1504, related SKU 1506, images to web 1508, user notes 1510, product category 1512, product description 1514, alias item code 1516, long name 1518, file size 1520, creation date 1522, colors 1524 (of the product shown in the graphic) and sizes 1526 (of the product shown in the graphic file). This form is particularly beneficial to graphic artists who are creating a catalog. The particular attributes (but not their values) shown together with the very low resolution thumbnail graphics file 1528 are stored in the user profile for the end user accessing the DCM server 132.

The user may edit these to add or remove particular attributes to be displayed in any of the aforementioned views. In addition, the user profile may include rules restricting the end user from viewing certain attributes, for example, cost and volume discounts for particular products shown in the thumbnail graphic.

In FIG. 13, a text view of the search results is shown, in which no associated thumbnail graphic is provided. The attributes shown here are file name 1302, SKU 1304, related SKU 1306, product description 1308 and images to web 1310. This is particularly useful in very low bandwidth situations in which the communications link between the end user's workstation and DCM server 131 is quite slow. Again, as in the preceding example, the user can select the particular attributes that are to be displayed.

Once the Java applet presents the search results to the end user in the designated form on the screen of the end user's workstation, the end user can scroll through the search results and select particular listed files for insertion into a page layout application program document. In the preferred mode of operation, the page layout application program will run simultaneously with the browser program that executes the Java applets. The page layout application program more preferably will be minimized or function in a background mode when the end user interacts with the browser. The end user will select the desired graphic file from the list of search results in the browser window, and will transfer the graphic file to the page layout application program document. Typically, this transfer occurs by the end user copying the desired graphics file to the workstation's operating system's clipboard, or by dragging the graphics file from the browser window and dropping it in the window of the page layout application program. Once in the page layout application program document, the user can manipulate the image to place it in the desired location.

While the searching and placing process described above has been described in conjunction with a graphic file stored in DCM database 132, it is not limited to graphics files. The end user may search for and place other file types as well in the same manner. These file types preferably include font files, logo files, text files, and page layout files. Although a page layout application program is mentioned in the above searching and placing process, it is equally applicable to desktop publishing programs as well.

When the page layout application program document has been assembled, typically of elements such as graphic files, text files and logos, the end user will then save the assembled document back to the central service facility's DCM system 130 and HSM system 120 in the following manner.

The end user first transfers the document from the page layout program to the browser. This is preferably done using the end user workstation operating system's drag and drop capability or by transferring the document to the operating system's clipboard and pasting it in the browser. Once in the browser, the user selects the "upload" icon which indicative of Java applets document uploading sub-routine. When this sub-routine is selected, the Java applet communicates data indicative of the end user, the file(s) being uploaded, and the save request to DCM server 131. When DCM server 131 receives this information, it queries the user =profile to determine whether the end user has the appropriate access rights to upload the document.

If the document is a new document, DCM server 131 will query the user profile to see if the end user has access rights to upload a new document, and hence create a new record entry in DCM database 132.

If the end user is merely saving an edited version of a page layout application program document that the end user previously copied from the DCM database 132, DCM server 131 will query the user profile to determine if the end user's access rights include the right to save a revised document over an existing document, thus erasing the previous document and replacing it with the end user's newly edited document.

If the document is to be saved as a new document file, and the end user has rights to save a new document and therefore create a new file entry in DCM database 132, DCM server 131 will transmit a request for attribute information to the browser. When the browser receives this request, it will query the end user for predetermined attributes, such as the file name. This query will preferably be displayed as a prompt on the end user's workstation screen. The end user then enters the predetermined required attribute information and transmits this information to DCM server 131. The browser then transmits the document file to DCM server 131, and DCM server 131 creates a new database entry for the document file in DCM database 132. The document file is then transmitted to HSM server 122 to be stored in one or more storage devices: 1002, 1004, 1006.

Advantageously, when creating the new DCM database 132 entry for the document, DCM server 131 examines the contents of the document file, determines the file type based upon the contents, and creates an appropriate entry in the DCM database 132. This includes the steps of identifying the attributes predefined for that file type in DCM database 132 and creating new entries in the asset tables for those attributes and associating them with the document file.

While the embodiments illustrated in the FIGURES and described above are presently preferred, this should be understood that the embodiments are offered by way of example only. Other embodiments may include any variation of configurations, file attributes or any type of communication network. The invention is not limited to a particular embodiment, but extends to various modifications, combinations, and permutations that nevertheless fall within the scope and spirit of the appended claims.

What is claimed is:

1. A printing and publishing system providing prepress, content management, infrastructure, and workflow services to system subscribers using computers equipped with the AppleTalk communication protocol in real time using a communication network, the printing and publishing system comprising:

an end user facility coupled to a communication network, the end user facility providing page building operations using computers equipped with the AppleTalk communication protocol, the page building operations including the design and construction of pages from images, text, and data available via said communication network;

a central service facility coupled to said communication network, the central service facility providing storage, file processing, remote access, and content management operations; the file processing operations including generating a plate-ready file from pages designed at said end user facility, said plate-ready file having a file format capable of high resolution and ready for creation of a printing plate; and a printing company facility coupled to said communication network, the printing company facility providing printing operations, the printing operations including producing a printing plate from said plate-ready file.

2. The printing and publishing system of claim 1, wherein the end user facility further comprises a communication routing device coupling the end user facility to the communication network, a computer which performs page building operations, and a proofer which provides printed samples of pages.

3. The printing and publishing system of claim 2, wherein the routing device is connected to an asynchronous transfer mode (ATM) switch.

4. The printing and publishing system of claim 1, wherein the computers at said end user facility comprise a chooser which provides selection of TCP/IP communication.

5. The printing and publishing system of claim 1, wherein the computers used at said end user facility are Macintosh computers.

6. The printing and publishing system of claim 1, wherein the computers used at said end user facility are workstations.

7. The printing and publishing system of claim 1, wherein the communication network Includes any one of data packets associated with a packet switched network and data cells associated with a cell switched network.

8. The printing and publishing system of claim 7, wherein the cell switched network comprises an asynchronous transfer mode (ATM) network.

9. The printing and publishing system of claim 1, wherein the central service facility are remotely located from the end user facility and printing customer facility.

10. A method for providing printing and publishing services to a remote client in real time using a Transmission Control Protocol/Internet Protocol (TCP/IP) network and an AppleTalk Protocol network, the method comprising:

genarating a page layout on a computer equipped with the AppleTalk communication protocol at a remote client;

choosing a TCP/IP communication mode on said computer;

communicating said page layout to a remote service facility via a communication network utilizing TCP/IP; and providing said PDF file to said remote client for proofing and revision of the page layout.

11. A method for providing printing and publishing services to a remote client in real time using a Transmission Control Protocol/Internet Protocol (TCP/IP) network and an AppleTalk Protocol network, the method comprising:

generating a page layout on a computer equipped with the AppleTalk communication protocol at a remote client;

choosing a TCP/IP communication mode on said computer;

communicating said page layout to a remote service facility via a communication network utilizing TCP/IP; and generating a plate-ready file from a page layout file.

* * * * *